(12) United States Patent
Guggilla et al.

(10) Patent No.: US 11,734,328 B2
(45) Date of Patent: Aug. 22, 2023

(54) ARTIFICIAL INTELLIGENCE BASED CORPUS ENRICHMENT FOR KNOWLEDGE POPULATION AND QUERY RESPONSE

(71) Applicant: ACCENTURE GLOBAL SOLUTIONS LIMITED, Dublin (IE)

(72) Inventors: Chinnappa Guggilla, Bangalore (IN); Praneeth Shishtla, Bangalore (IN); Madhura Shivaram, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1287 days.

(21) Appl. No.: 16/195,471

(22) Filed: Nov. 19, 2018

(65) Prior Publication Data

US 2020/0073882 A1 Mar. 5, 2020

(30) Foreign Application Priority Data

Aug. 31, 2018 (IN) .............................. 201811032723

(51) Int. Cl.
*G06F 16/35* (2019.01)
*G06F 16/93* (2019.01)
*G06N 5/02* (2023.01)
*G06N 20/00* (2019.01)
*G06F 16/33* (2019.01)
*G06F 16/28* (2019.01)
*G06F 3/01* (2006.01)

(52) U.S. Cl.
CPC .......... *G06F 16/353* (2019.01); *G06F 16/288* (2019.01); *G06F 16/3347* (2019.01); *G06F 16/93* (2019.01); *G06N 5/02* (2013.01); *G06N 20/00* (2019.01)

(58) Field of Classification Search
CPC .... G06F 16/353; G06F 16/93; G06F 16/3347; G06F 16/288; G06N 20/00; G06N 5/02
See application file for complete search history.

(56) References Cited

U.S. PATENT DOCUMENTS

| 5,021,988 | A | * | 6/1991 | Mashiko | ................ G06N 3/065 706/30 |
| 5,309,359 | A | | 5/1994 | Katz et al. | |
| 5,404,295 | A | | 4/1995 | Katz et al. | |

(Continued)

*Primary Examiner* — Nicholas Augustine
(74) *Attorney, Agent, or Firm* — Mannava & Kang, P.C.

(57) ABSTRACT

In some examples, artificial intelligence based corpus enrichment for knowledge population and query response may include generating, based on annotated training documents, an entity and relation annotation model, identifying, based on application of the entity and relation annotation model to a document set that is to be annotated, entities and relations between the entities for each document of the document set to generate an annotated document set, and categorizing each annotated document into a plurality of categories. Artificial intelligence based corpus enrichment may include determining whether an identified category includes a specified number of annotated documents, and if not, additional annotated documents may be generated for the identified category that may represent a corpus. Further, artificial intelligence based corpus enrichment may include training, using the corpus, an artificial intelligence based decision support model, and utilizing the artificial intelligence based decision support model to respond to an inquiry.

18 Claims, 22 Drawing Sheets

(56) References Cited

U.S. PATENT DOCUMENTS

| | | | |
|---|---|---|---|
| 7,464,093 B2* | 12/2008 | Horvitz | G06F 16/353 |
| | | | 707/999.009 |
| 10,162,850 B1* | 12/2018 | Jain | G06F 16/93 |
| 2010/0223276 A1* | 9/2010 | Al-Shameri | G06V 20/13 |
| | | | 707/769 |
| 2017/0039198 A1* | 2/2017 | Ramamurthy | G06F 16/93 |
| 2017/0235848 A1* | 8/2017 | Van Dusen | G06F 16/904 |
| | | | 705/12 |
| 2018/0101784 A1* | 4/2018 | Rolfe | G06F 15/80 |
| 2018/0189292 A1* | 7/2018 | Grace, Jr. | G06F 16/24578 |
| 2018/0276557 A1* | 9/2018 | Tanamoto | G06N 5/01 |
| 2018/0329990 A1* | 11/2018 | Severn | G06V 10/764 |
| 2019/0266573 A1* | 8/2019 | Radhakrishnan | G06F 16/383 |

* cited by examiner

ABC Repair Inc.

BILL TO  
123, ABC Avenue, New York, NY 10101

SHIP TO  
ADDRESS

INVOICE # 00123  
INVOICE DATE 3/25/2014  
PO # 123456  
DUE DATE 4/5/2014

| QTY | DESCRIPTION | UNIT PRICE | AMOUNT |
|---|---|---|---|
| 1 | FRONT AND REAR BRAKE CABLES AND THROTTLE CABLE | 56.00 | 56.00 |
| 1 | NEW SET OF PEDAL ARMS | 182.00 | 182.00 |
| 3 | LABOR 3HRS | 25.00 | 75.00 |
| | | SUBTOTAL | 313.00 |
| | | SALES TAX 5.0% | 15.65 |
| | | TOTAL | 328.65 |

TERMS & CONDITIONS

ABC Repair Inc.
- InvoiceNumber
- InvoiceDate
- PONumber
- InvoiceTotal
- Currency
- VendorName ABC Ltd.

BILL TO  
111, ABC Avenue, New York, NY 10101

SHIP TO  
ADDRESS

INVOICE #    INV123  
INVOICE DATE    11/1/2001

| PO# | SALES REP. NAME | SHIP DATE | SHIP VIA | TERMS | | DUE DATE |
|---|---|---|---|---|---|---|
| 0000121212 | SALES1 | 11/17/2006 | UPS | NET 7 | | |

| PRODUCT ID | DESCRIPTION | QUANTITY | UNIT PRICE | LINE TOTAL |
|---|---|---|---|---|
| P1003 | MOTOROLA E815 | 10 | 420.00 | 4,200.00 |
| P1000 | NOKIA 3220 | 12 | 199.99 | 2,399.88 |
| P1004 | NON-TAXABLE ITEM | 5 | 200.00 | 1,000.00 |
| P1002 | IT IS A SERVICE | 3.2 | 255.52 | 617.66 |
| P1006 | MOTOROLA V3 RAZR BLACK | 10 | 500.00 | 5,000.00 |
| | | | SUBTOTAL | 13,417.54 |
| | | | PST 6.50% | 807.14 |
| | | | OST 3.20% | 397.36 |
| | | SHIPPING AND HANDLING | | |
| | | | TOTAL | 14,622.04 |
| | | | PAID | |
| | | | TOTAL | 14,622.04 |

NOTES:

THANK YOU FOR YOUR BUSINESS!

ABC Ltd.
- InvoiceNumber
- InvoiceDate
- PONumber
- Currency
- VendorName
- InvoiceTotal
- DueDate

*FIG. 5B*

XYZ Inc.

BILL TO
11111, ABC
Avenue, New
York, NY 10101

INVOICE #    XYZ-009
INVOICE DATE    AUG 31ST, 2011
DUE DATE    SEPT 1, 2011
BALANCE DUE    11812.50

NONUMMY NIBH EUISMOD TINCIDUNT

| LOBORTIS NISL UT ALIQUIP | LOBORTIS NISL UT ALIQUIP | OBORTIS NISL UT ALIQUIP EX DUIS AUTEM VEL EUM | UPTATUM ZZRIL DELENIT | EUISMOD TINCIDUNT |
|---|---|---|---|---|
| ERAT VOLUTPAT | COMMODO CONSEQUAT | FEUGAIT NULLA | CONSEQUAT | $11,812.50 |
| | NISL UT ALIQUIP EX | HENDRERIT IN VULPUTATE | ADIPISCING ELIT | QUIS NOSTRUD |
| | ULLAMCORPER | ACCUMSAN | FEUGAIT | DIGNISSIM |

| UT WISI ENIM | ENIM AD MINIM | IUSTO ODIO | EUISMOD NISL UT ALIQUIP | NOSTRUD VENIAM | AUGUE ADIPISCING | IRIURE FEUGAIT | NOSTRUD EUISMOD TINCIDUNT | ECTETUER LAOREET |
|---|---|---|---|---|---|---|---|---|
| NONUMMY NIBH | ADIPISCING ELIT | IRIURE DOLOR IN | QUI BLANDIT | VENIAM | ADIPISCING | | TINCIDUNT | 800.00 |
| DOLOR SIT AMET | TE FEUGAIT | DUIS AUTEM VEL | ERAT VOLUTPAT | FEUGAIT | SUSCIPIT | | ULLAMCORPER | 2,000.00 |
| NISL UT ALIQUIP | CONS ECTETUER | LOBORTIS NISL | AUTEM VEL EUM | VELIT ESSE | DELENIT | | ECTETUER | 2,000.00 |
| | UT LAOREET | ERAT VOLUTPAT | ODIO DIGNISSIM | HENDRERIT IN | VEL EUM | | SED DIAM | 4,800.00 |

LUPTATUM ZZRIL DELENIT

| ALIQUAM ERAT | 1 | BLANDIT PRAESENT | DUIS AUTEM VEL EUM IRIURE DOLOR | | 50.00 | | | 360.00 |
|---|---|---|---|---|---|---|---|---|
| ESSE MOLESTIE CONSEQUAT | | | | | | | | |
| SUSCIPIT LOBORTIS | 7 | ALIQUIP EX EA | CONS ECTETUER ADIPISCING ELIT | | 18.00 | | | 500.00 |
| FEUGAIT NULLA | 6 | ULLAMCORPER | NIBH EUISMOD TINCIDUNT UT LAOREET | | 21.00 | | | 180.00 |
| VERO EROS ET | 2 | ALIQUAM ERAT | UT WISI ENIM AD MINIM VENIAM | | 120.00 | | | 1,050.00 |
| | | | QUIS NOSTRUD EXERCI TATION ULLAMCORPER | | 35.00 | | | 500.00 |
| | | | NONUMMY NIBH EUISMOD | | 244.00 | | | 2,590.00 |

ADIPISCING ELIT

| QUIS | EUISMOD | ACCUMSAN | ULLAMCORPER | FEUGAIT | EXERCI |
|---|---|---|---|---|---|
| VULPUTATE VELIT | LUPTATUM ZZRIL | RIURE DOLOR | | | |
| | | | DUIS AUTEM VEL EUM IRIURE | 6.00 | 6,540.00 |
| | | | | 2.00 | 1,770.00 |
| | | | CONSECTETUER ADIPISCING ELIT | 4.00 | 980.00 |

| | | |
|---|---|---|
| | NULLA FACILISI | $10,000.00 |
| | MINIM VENIAM | $812.00 |
| | BLANDIT PRAESENT | $500.25 |
| | DOLORE MAGNA | $500.25 |
| | TOTAL | 11,812.50 |

LOREM IPSUM DOLOR SIT AMET, CONSECTETUER ADIPISCING ELIT, SED DIAM

XYZ Inc.
- InvoiceNumber
- InvoiceDate
- Invoice Number
- VendorName
- Currency
- DueDate
- BalanceDue
- InvoiceTotal

FIG. 5C

| SEE ALL INVOICES | | | | PDF | PRINT |

INVOICE

PAID

| INVOICE ID | 0051 |
| ISSUE DATE | 06/05/2017 |
| DUE DATE | 06/05/2017 (UPON RECEIPT) |
| SUBJECT | SPRING MARKETING CAMPAIGN |

| ITEM TYPE | DESCRIPTION | QUANTITY | UNIT PRICE | AMOUNT |
|---|---|---|---|---|
| SERVICE | DESIGN | 41.00 | £230.00 | £9,430.00 |
| SERVICE | DEVELOPMENT | 57.00 | £330.00 | £18,810.00 |
| SERVICE | MEETINGS | 4.50 | £60.00 | £270.00 |
| | | | SUBTOTAL | £28,510.00 |
| | | | TAX (10%) | £2,851.00 |
| | | | PAYMENTS | -£31,361.00 |
| | | | AMOUNT DUE | £0.00 |

*FIG. 7A*

CREDIT NOTE

NAME: JOHN SMITH

| DESCRIPTION | QUANTITY | UNIT PRICE | VAT | AMOUNT GBP |
|---|---|---|---|---|
| CREDIT FOR DAMAGED GOODS | 1.00 | UNIT PRICE | 15% | 78.60 |
| | | | SUBTOTAL | 78.60 |
| | | | LESS CREDIT TO INVOICE(S) | 11.79 |
| | | | TOTAL | 90.39 |
| | | | TOTAL | 90.39 |
| | | | REMAINING CREDIT | 0.00 |

*FIG. 7B*

|                                    | DEBIT NOTE |
|---|---|
| INVOICE NO.: | DATE: |

NAME: JOHN SMITH

COMMENTS / SPECIAL INSTRUCTIONS:

| QUANTITY | DESCRIPTION | UNIT PRICE | TOTAL |
|---|---|---|---|
|  |  |  |  |
|  |  | SUBTOTAL: | |
|  |  | SALES TAX: | |
|  |  | SHIPPING AND HANDLING: | |
|  |  | TOTAL DUE: | |

AUTHORIZED SIGNATURE

MAKE ALL CHECKS PAYABLE TO:
PAYMENT IS DUE WITHIN 30 DAYS
IF YOU HAVE ANY QUESTIONS CONCERNING THIS INVOICE, CONTACT:
THANK YOU FOR YOUR BUSINESS

BANK NAME

NAME: JOHN SMITH

CONS ECTETUER ADIPISCING ELIT
ED DIAM NONUMMY NIBH EUISMOD TINCIDUNT

| DUIS AUTEM VEL EUM IRIURE DOLOR IN HENDRERIT IN | |
|---|---|
| BLANDIT PRAESENT | DUIS AUTEM VEL |
| ADIPISCING ELIT | AUTEM VEL EUM |
| VULPUTATE VELIT | LUPTATUM ZZRIL |
| MINIM VENIAM | DOLORE MAGNA |
| VELIT ESSE | SUSCIPIT LOBORTIS |

NONUMMY NIBH EUISMOD

| | ADIPISCING ELIT | | HENDRERIT IN | |
|---|---|---|---|---|
| COMMODO CONSEQUAT | | | DUIS AUTEM VEL | |
| ERAT VOLUTPAT | 10 | | VELIT ESSE | |
| NONUMMY NIBH | 3 | | LUPTATUM ZZRIL | |
| CONS ECTETUER | 5 | | RIURE DOLOR | |
| AUTEM VEL EUM | 18 | | | |

LOREM IPSUM DOLOR SIT AMET, CONSECTETUER ADIPISCING ELIT, SED DIAM

CONSECTETUER ADIPISCING ELIT

| | | TINCIDUNT |
|---|---|---|
| ALIQUIP EX EA | LOREM IPSUM DOLOR SIT | |
| QUI BLANDIT | SUSCIPIT LOBORTIS | 480.00 |
| ERAT VOLUTPAT | MINIM VENIAM | 630.00 |
| IRIURE DOLOR IN | FEUGAIT NULLA | 1,020.00 |
| CONS ECTETUER | ADIPISCING ELIT | 3,000.00 |
| LOBORTIS NISL | VULPUTATE VELIT | 500.00 |
| NONUMMY NIBH | LUPTATUM ZZRIL | 2,650.00 |
| ALIQUAM ERAT | TATION ULLAMCORPER | 620.00 |
| NISL UT ALIQUIP | QUIS NOSTRUD EXERCI | 520.00 |
| ALIQUIP EX EA | CONS ECTETUER ADIPISCING | 2,480.00 |
| | | 11,900.00 |

ESSE MOLESTIE CONSEQUAT

*FIG. 7E*

ARTIFICIAL INTELLIGENCE BASED CORPUS ENRICHMENT FOR KNOWLEDGE POPULATION AND QUERY RESPONSE

PRIORITY

The present application claims priority under 35 U.S.C. 119(a)-(d) to Indian patent application number 201811032723, having a filing date of Aug. 31, 2018, the disclosure of which is hereby incorporated by reference in its entirety.

BACKGROUND

A corpus may be described as a set of historical documents, where the documents may pertain to a particular subject. Industries that depend on automatic decision support systems may leverage such a corpus. However, an extent of a corpus may be limited, and not readily available in a form that is needed to build an artificial intelligence (AI) based decision support system.

BRIEF DESCRIPTION OF DRAWINGS

Features of the present disclosure are illustrated by way of example and not limited in the following figure(s), in which like numerals indicate like elements, in which:

FIGS. 5A-5C illustrate example invoices and corresponding potential entities that will be annotated with respect to operation of the entity and relation annotator of the artificial intelligence based corpus enrichment for knowledge population and query response apparatus of FIG. 1, in accordance with an example of the present disclosure;

FIGS. 7A-7E illustrate examples of invoices, credit notes, and remittances to illustrate operation of the document categorizer of the artificial intelligence based corpus enrichment for knowledge population and query response apparatus of FIG. 1, in accordance with an example of the present disclosure;

DETAILED DESCRIPTION

Figure 1:
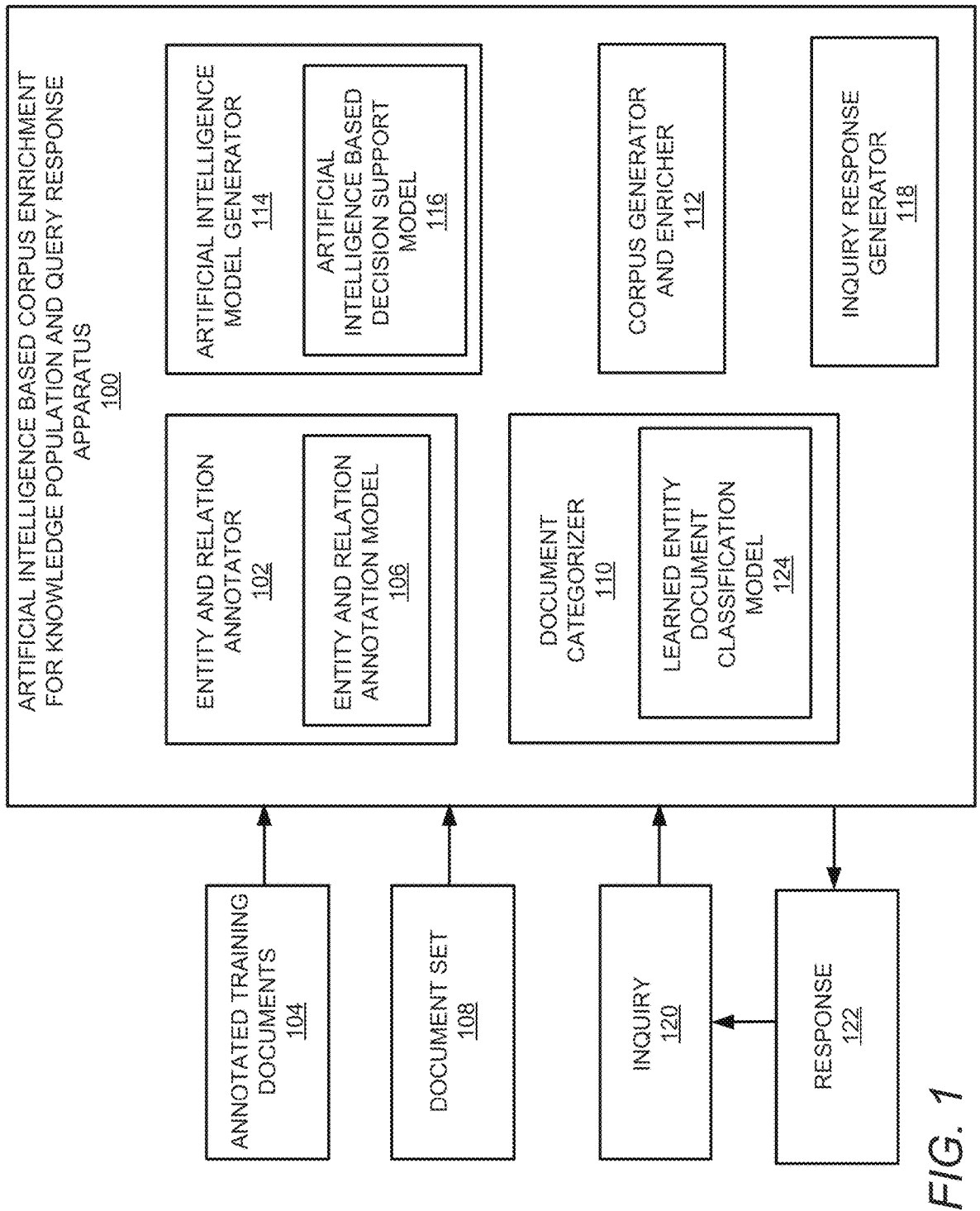
FIG. 1 illustrates a layout of an artificial intelligence based corpus enrichment for knowledge population and query response apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Artificial intelligence based corpus enrichment for knowledge population and query response apparatuses, methods for artificial intelligence based corpus enrichment for knowledge population and query response, and non-transitory computer readable media having stored thereon machine readable instructions to provide artificial intelligence based corpus enrichment for knowledge population and query response are disclosed herein. The apparatuses, methods, and non-transitory computer readable media disclosed herein may provide generation of training samples for entity extraction from annotated documents, such as, invoice documents. In this regard, the apparatuses, methods, and non-transitory computer readable media disclosed herein may provide for building of a knowledge base by preprocessing and representing entity-annotated training samples for documents, such as invoices, capturing semantic variations of representations, and implementing language generation to learn patterns from various entity expressions from a set of training samples. Given, for example, a sample of vendor-specific invoices, the apparatuses, methods, and non-transitory computer readable media disclosed herein may generate invoice samples from learned representations.

As disclosed herein, with respect to a corpus that may be described as a set of historical documents, where the documents may pertain to a particular subject, industries that depend on automatic decision support systems may leverage such a corpus. However, an extent of a corpus may be limited, and not readily available in a form that is needed to build an AI based decision support system. In this regard, it is technically challenging to generate a corpus that is usable for building an AI based decision support system.

In order to address the aforementioned technical challenges associated, for example, with generation of a corpus that is usable for building an AI based decision support system, the apparatuses, methods, and non-transitory computer readable media disclosed herein may implement a framework based on advanced natural language processing (NLP) and deep learning (DL) techniques to enrich, annotate, and categorize a corpus, for transforming the corpus to be useful for building efficient AI-based decision making systems.

The apparatuses, methods, and non-transitory computer readable media disclosed herein may be implemented in various fields, such as, for example, in the area of finance and accounting. For example, the apparatuses, methods, and non-transitory computer readable media disclosed herein may be implemented in the area of account payables and receivables. The apparatuses, methods, and non-transitory computer readable media disclosed herein may facilitate the population of enterprise resource planning databases with the knowledge and information present in account payable and receivable documents. In this regard, the apparatuses, methods, and non-transitory computer readable media disclosed herein may be utilized to address various types of end-user (e.g., vendor queries) with the effective enablement of a corpus annotation, categorization, and enrichment (CACE) framework to extract information from documents.

For the apparatuses, methods, and non-transitory computer readable media disclosed herein, the natural language processing and deep learning-based CACE framework may provide for continuous annotation of an initial raw corpus with a predefined set of knowledge and entities related to a specified domain and/or industry. The apparatuses, methods, and non-transitory computer readable media disclosed herein may provide natural language processing and deep learning-based entity and knowledge-driven fine-grained corpus categorization. The apparatuses, methods, and non-transitory computer readable media disclosed herein may provide natural language processing and deep learning-based corpus generation and enrichment based on character-based models. Further, the apparatuses, methods, and non-transitory computer readable media disclosed herein may provide a natural language processing and deep learning-based continuous entity and relation annotation framework of an initial raw corpus with a predefined set of knowledge and entities related to a specified domain and/or industry.

With respect to the apparatuses, methods, and non-transitory computer readable media disclosed herein, a subject matter expert may comprehend a particular industry process using various process specific documents. For example, in the accounts payables domain, agents that process payment documents may use invoices, purchase orders, and payment documents for gaining an understanding of related processes. In this regard, the agents may analyze various process specific entities present in invoices to make decisions. With respect to utilization of an entity identification task for learning models, these entities may need to be marked and identified using, for example, a graphical user interface. However, the marking and identification of such entities may be technically challenging. In order to address such technical challenges, the apparatuses, methods, and non-transitory computer readable media disclosed herein may implement a learning based model to implement annotation of all of the entities that are available in a set of entities, and to reduce the time needed to prepare training samples needed for building entity and relation detection models.

The apparatuses, methods, and non-transitory computer readable media disclosed herein may iteratively utilize a model continuously until all of the documents in a given corpus are annotated. Thus, the apparatuses, methods, and non-transitory computer readable media disclosed herein may implement a methodology and framework for continuous annotation for entity and relation detection by implementing an advanced deep learning technique to learn entity annotations from a limited number of historic annotations, to generate a model that may be used to mark entities from the rest of the training samples. The apparatuses, methods, and non-transitory computer readable media disclosed herein may utilize advanced deep learning to learn entity relations from historic annotations to predict new annotations for completely new documents. The apparatuses, methods, and non-transitory computer readable media disclosed herein may identify highly confident and less confident entities and relations from the predicted entities using the aforementioned methodologies. Further, the apparatuses, methods, and non-transitory computer readable media disclosed herein may convert low confident predicted entities into annotatable coding into completely new raw documents in an annotation graphical user interface tool.

The apparatuses, methods, and non-transitory computer readable media disclosed herein may provide a domain and language independent corpus annotation, generation, and categorization framework that may be implemented across various processes and industries. The apparatuses, methods, and non-transitory computer readable media disclosed herein may be scalable and generalizable across multiple industries such as finance, healthcare, education, etc. The apparatuses, methods, and non-transitory computer readable media disclosed herein may provide a generalized corpus categorization and generation engine that may be useful for various industries to categorize and enrich a corpus.

According to examples disclosed herein, the apparatuses, methods, and non-transitory computer readable media disclosed herein may leverage an intermediate fine grained summary of information (e.g., extracted entities) from invoice documents using advanced deep learning methods such as convolutional neural network (CNN), long short-term memory network (LSTM), and deep learning regression. The apparatuses, methods, and non-transitory computer readable media disclosed herein may implement the compiling and annotation of fine-grained entities from a collection of corpus.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example artificial intelligence based corpus enrichment for knowledge population and query response apparatus (hereinafter also referred to as "apparatus 100").

Referring to FIG. 1, the apparatus 100 may include an entity and relation annotator 102 that is executed by at least one hardware processor (e.g., the hardware processor 1102 of FIG. 11, and/or the hardware processor 1304 of FIG. 13) to generate, based on annotated training documents 104, an entity and relation annotation model 106.

The entity and relation annotator 102 may ascertain, a document set 108 that is to be annotated. Documents of the document set 108 may include unstructured documents and semi-structured documents.

The entity and relation annotator 102 may identify, based on application of the entity and relation annotation model 106 to the document set 108, entities and relations between the entities for each document of the document set 108 to generate an annotated document set.

A document categorizer 110 that is executed by the at least one hardware processor (e.g., the hardware processor 1102 of FIG. 11, and/or the hardware processor 1304 of FIG. 13) may categorize each annotated document of the annotated document set into a respective category of a plurality of categories.

A corpus generator and enricher 112 that is executed by the at least one hardware processor (e.g., the hardware processor 1102 of FIG. 11, and/or the hardware processor 1304 of FIG. 13) may identify a category of the plurality of categories. Further, the corpus generator and enricher 112 may determine whether the identified category includes a specified number of annotated documents. Based on a determination that the identified category does not include the specified number of annotated documents, the corpus generator and enricher 112 may generate, for the identified category, additional annotated documents. The annotated documents and the additional annotated documents of the identified category may together represent a corpus.

An artificial intelligence model generator 114 that is executed by the at least one hardware processor (e.g., the hardware processor 1102 of FIG. 11, and/or the hardware processor 1304 of FIG. 13) may train, using the corpus, an artificial intelligence based decision support model 116.

An inquiry response generator 118 that is executed by the at least one hardware processor (e.g., the hardware processor 1102 of FIG. 11, and/or the hardware processor 1304 of FIG. 13) may ascertain an inquiry 120 related to an entity (e.g., for an invoice, an invoice number, an invoice date, an invoice amount, etc.) of the corpus. For example, the inquiry 120 may include an inquiry about what is the invoice number, what is the invoice date, what is the invoice amount, etc. The inquiry response generator 118 may utilize the artificial intelligence based decision support model 116 to generate a response 122 to the inquiry 120. That is, the inquiry response generator 118 may generate, by invoking the artificial intelligence based decision support model, the response 122 to the inquiry 120. For example, the response to the inquiry may include, for an invoice, the invoice number, the invoice date, the invoice amount, etc.

Figure 2:
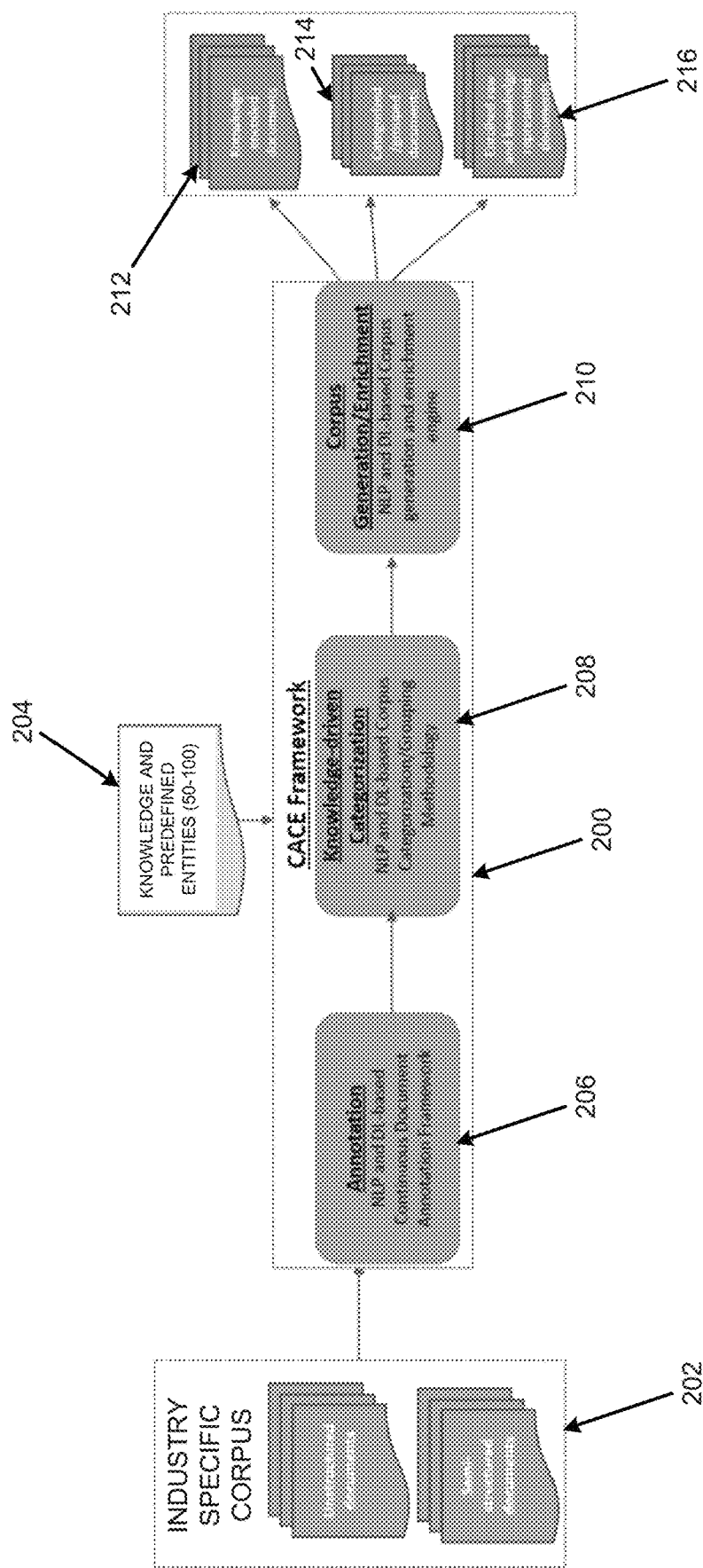
FIG. 2 illustrates a layout of a corpus annotation, categorization, and enrichment (CACE) framework for the artificial intelligence based corpus enrichment for knowledge population and query response apparatus of FIG. 1, in accordance with an example of the present disclosure.

FIG. 2 illustrates a layout of a corpus annotation, categorization, and enrichment (CACE) framework 200 for the artificial intelligence based corpus enrichment for knowledge population and query response apparatus 100, in accordance with an example of the present disclosure.

Referring to FIG. 2, the CACE framework 200 may include an input of unstructured documents and/or semi-structured documents at 202, and input of knowledge and predefined entities at 204. At 206, the CACE framework 200 may perform annotation (e.g., natural language processing and deep learning-based continuous document annotation framework) with respect to the unstructured documents and/or semi-structured documents received at 202. At 208, the CACE framework 200 may perform knowledge-driven categorization (e.g., natural language processing and deep learning-based corpus categorization and/or grouping) with respect to the annotated documents from block 206. At 210, the CACE framework 200 may perform corpus generation and/or enrichment (e.g., natural language processing and deep learning-based corpus generation and enrichment) with respect to the categorized documents at block 208. Output of the CACE framework 200 may include knowledge encoded documents at 212, categorized and grouped documents at 214, and enriched raw and knowledge represented documents at 216.

Operation of the entity and relation annotator 102 is described in further detail with reference to FIGS. 1-5C.

Figure 3:
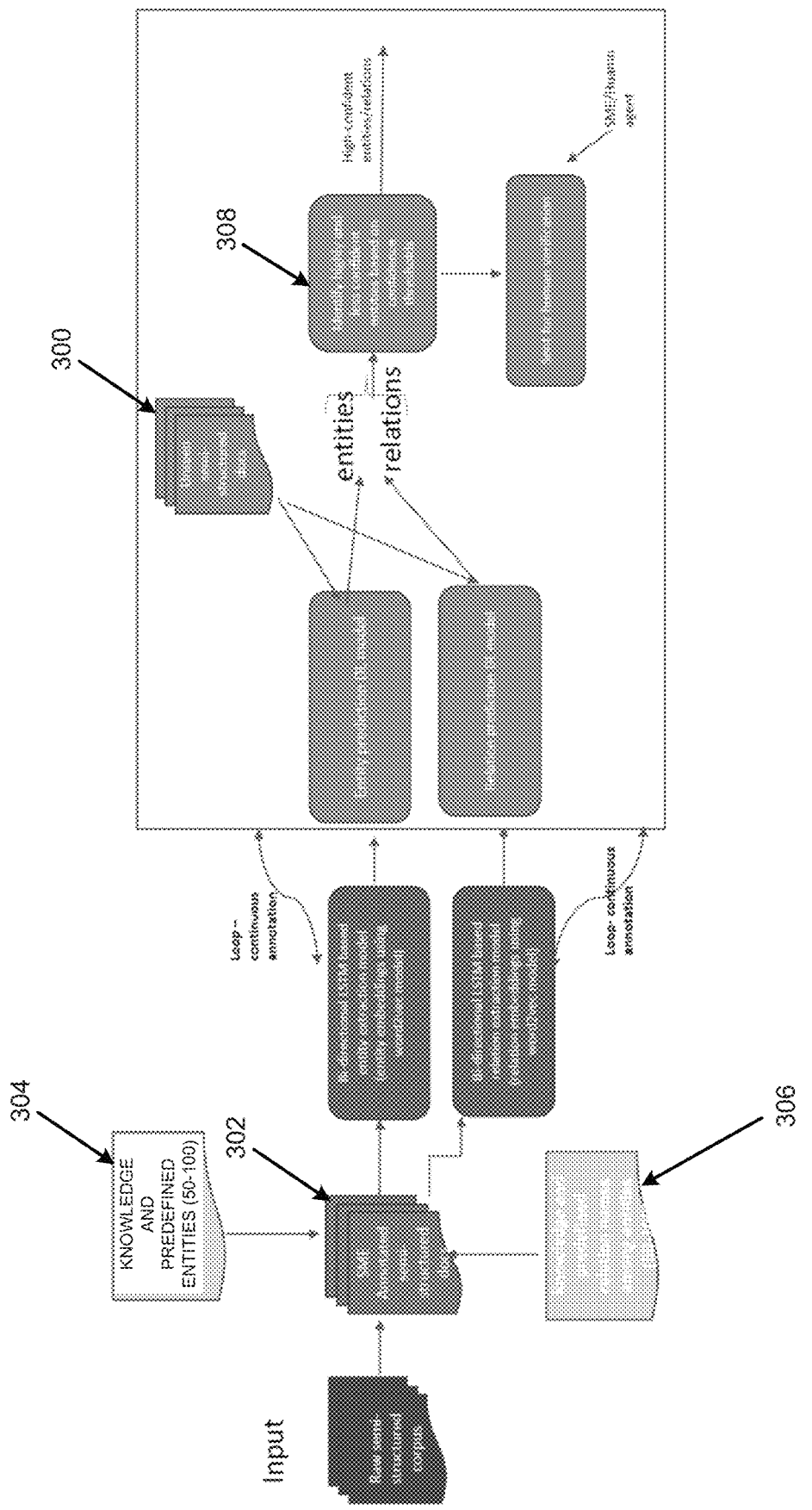
FIG. 3 illustrates a logical flow associated with operation of an entity and relation annotator of the artificial intelligence based corpus enrichment for knowledge population and query response apparatus of FIG. 1, in accordance with an example of the present disclosure.

FIG. 3 illustrates a logical flow associated with operation of the entity and relation annotator 102, in accordance with an example of the present disclosure.

Referring to FIG. 3, the entity and relation annotator 102 may implement a sub-process-1 to perform entity and relation annotation on the document set 108 (which may be a corpus) by utilizing an advanced deep learning technique to learn entity annotations from a limited number of historic annotations, and generate an entity and relation annotation model 106. In this regard, all references to corpus are for illustrative purposes, and otherwise, the apparatus 100 may be utilized with a general set of documents. With respect to deep learning, a historic set of documents may be annotated with a predefined set of entities (e.g., invoice number, purchase order number, invoice date, invoice amount, vendor name, etc., by a subject matter expert in a particular domain using an existing graphically enabled annotation user interface where the subject matter expert may mark various entities present in the documents with various colors. These annotated documents may be used as a training set for the machine learning and/or deep learning models to learn various entity specific patterns. Each annotated document in the training set may be segmented into a set of sequences (e.g., sentences, paragraphs) including marked entities. The sequences may function as learning representation units for deep learning and/or machine learning models such as long short-term memories (LSTMs). Vocabulary in these sequences may be transformed into semantic vectors of varying dimensions [e.g., 50, 100, 200, 300] including numerical values denoting syntactic and semantic weights which may be further used as input vectors for LSTM-based deep neural networks. These models may iterate over each input sequence and learn entity-specific shallow and abstract patterns from longer contexts with corresponding weights iteratively from every sequence or a batch of sequences. After a certain number of iterations, the model may learn the right patterns for each entity from the historical annotations, and for given a new document, based on the context of the sequences present in a new document, the learned LSTM model may predict a correct entity-name for the vocabulary present in a sequence using learned weights for each entity pattern from the historical annotations.

Figure 5A:
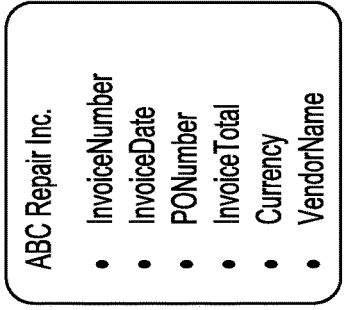

With continued reference to FIG. 3 and the sub-process-1 that is implemented by the entity and relation annotator 102, the entity and relation annotation model 106 (illustrated in FIG. 3 as entity prediction DL model, and relation prediction DL model) may be used to mark (e.g., annotate) the entities from new and/or feedback documents at 300. In this regard, FIGS. 5A-5C illustrate example invoices and corresponding potential entities that will be annotated with respect to operation of the entity and relation annotator 102, in accordance with an example of the present disclosure. Entities may scatter across different locations of an invoice document based on vendor format. As shown in FIG. 5A, for the 'ABC Repair Inc.' vendor, the entities that are targeted to annotate may include InvoiceNumber, InvoiceDate, PONumber, InvoiceTotal, Currency and VendorName. Some entities that may occur at the top of the invoice may sometimes occur in the body of the invoice. Similarly, in FIG. 5B related to the 'ABC Ltd' vendor, the potential entities that may be annotated include InvoiceNumber, InvoiceDate, PONumber, InvoiceTotal, Currency, DueDate and VendorName. In FIG. 5C related to 'XYZ Inc.', the vendor entities that may be annotated include InvoiceNumber, InvoiceDate, PONumber, InvoiceTotal, Currency, DueDate, BalanceDue, and VendorName.

Input to the sub-process-1 performed by the entity and relation annotator 102 may include, at 302, entity annotated documents, for example, from subject matter experts. In this regard, the entity annotated documents may include an initial corpus of semi-structured documents that may include predefined entities specific to a process as shown at 304 (e.g., accounts payable finance domain).

With continued reference to FIG. 3 and the sub-process-1 that is implemented by the entity and relation annotator 102, the entity and relation annotator 102 may utilize an existing entity annotation framework for entity detection from raw process documents with predefined entities. In this regard, a few raw samples of documents may be marked with respect to entities. The entity and relation annotator 102 may generate, based on the aforementioned annotated training documents, the entity and relation annotation model 106 by transforming each annotated training document of the annotated training documents into a vector representation, and generating, based on vector representations of the annotated training documents, the entity and relation annotation model. That is, the entity and relation annotator 102 may transform the entity-annotated corpus into vector representations, and set different parameters for a word2vec process and entity-embeddings. For example, once the invoice document as shown in FIG. 5A is annotated with the specified set of entities, vocabulary in the annotated invoice may be replaced by the corresponding entity name. For example, in FIG. 5A, each line or vendor segment, 'Bill To' and 'ShipTo' may be considered as chunks. All of the chunks in the historical annotated invoices may then be considered as a training corpus, and fed into the word2vec learning process where invoice 'ABC Repair Inc.' may be replaced by 'VendorName', 'Total' may be replaced by the entity 'InvoiceTotal', and '$' may be replaced by the 'Currency' entity name. Similarly, the remaining entity names may be substituted in the corresponding vocabulary. As disclosed herein, the entity annotated historical corpus may be decomposed into meaningful chunks and/or paragraphs. For example, in FIG. 5A, the 'Bill To' vertical segment, the 'Ship To' vertical segment, and 'Invoice #00123' phrases may represent meaningful chunks, and considered as training samples. Syntactic and semantic variations of these entity names denoted entity embeddings may be learned through the semantic distribution process denoted word2vec. The word2vec process may learn semantic variations of entities using a shallow neural representation using a skip-gram based negative sampling technique. In this regard, the word2vec process may generate a weighted representation for each entity by learning contexts based on the assumption that words that occur together tend to be similar semantically. The word2vec process may be trained on chunks of the historical corpus by representing each entity into a numerical word vector with the defined dimensions. In this regard, dimensions may refer to a number of entity semantic variations, and dimensions may be set to the [50-300] range during the training. The context window for skip-gram models may be specified in the range of [1,10], and the word2vec process may be trained. In this manner, the entity-annotated corpus may be transformed into entity vectors including numerical weights that may be used for learning entities from the unseen corpus.

With continued reference to FIG. 3 and the sub-process-1 that is implemented by the entity and relation annotator 102, the entity and relation annotator 102 may implement bi-directional attention based LSTM sequential deep learning by considering entity embeddings as input representation, train and tune various parameters, and build the entity and relation annotation model 106 based on testing with a specified test set of documents. For the example of FIG. 5A, each chunk of the invoice document may be represented as a sequence with corresponding labels such as InvoiceNumber, PONumber, InvoiceDate, InvoiceTotal, VendorName, etc. For example, the value '00123' present in the chunk 'Invoice #00123' may be tagged as InvoiceNumber entity name. Similarly, the value $328.65 in the Total $328.65' chunk may be labeled as 'InvoiceTotal'. The '$' in the same phrase may be represented as 'Currency' entity. Similarly all the chunks and/or sequences in the annotated corpus may be tagged with corresponding entity labels, and may be used as representative training samples. These training samples may be represented with learned entity and vocabulary embeddings as disclosed herein, and may be used to learn sequential patterns for various entities present in the corpus. These patterns may be learned using the deep learning based sequential tagging approach denoted LSTMs, to label entities. A variation of LSTMs denoted bi-directional LSTM for learning entities may be trained on the training set. During the training, various LSTM parameters specific to the training set may be determined and/or modified. Some of these parameters may include, for example, entity embedding dimensions [50-100], batch-size (in multiples of 8), drop-out [0.1,0.95], number of iterations, number of hidden layers, etc. In this regard, a grid-search may be used to optimize the model for tuning hyper parameters, and to build an accurate entity and relation annotation model 106.

With continued reference to FIG. 3 and the sub-process-1 that is implemented by the entity and relation annotator 102, given an unseen corpus that is to be annotated, the entity and relation annotation model 106 may determine entities for documents of the corpus. For the example of FIG. 5A, given a new invoice sample, using trained model entities such as invoice number, invoice date, due date, invoice total, due amount, and vendor name may be predicted with the probability estimates. These probabilities for the entities may be determined using a softmax methodology at the last layer of the trained LSTM models. The entities that are predicted with high probabilities (e.g., probability scores) may be stored in an enterprise resource planning database for the subject matter expert knowledge reference for resolving various end-user queries in a specific financial process. For example, in the accounts payables and receivables financial process, an invoice number may be used to know about the payment status of a vendor invoice.

With continued reference to FIG. 3 and the sub-process-1 that is implemented by the entity and relation annotator 102, for each predicted entity, the entity and relation annotation model 106 may determine a confidence score in terms of predicted probabilities. The highest threshold using the entity probabilities may be empirically determined using a set of invoice samples where entities are correctly tagged. Using these invoice samples as a test set, corresponding probabilities may be predicted. The probabilities of all the entities that are correctly predicted may be considered in increasing values order from the test set invoice samples to determine the minimum probability where the entity prediction is correct. This probability may be considered as a 'confidence threshold' for that entity. In this way, confidence thresholds may be determined for each entity. Given the unseen invoice sample from a new vendor, using the trained entity and relation annotation model 106, the required entities may be predicted with corresponding probabilities. If the entity 'InvoiceTotal' probability value is >=the entity_confidence_threshold, then it is deemed as a correct entity. If the predicted probability value is less than the entity_confidence_threshold, then it is considered as a less confident entity and may require review from a subject matter expert. If there are two entities that are predicted with marginal difference in probabilities, these entities may also be reviewed by a subject matter expert. For example, if 'InvoiceTotal' and 'Duebalance' are predicted with marginal probability difference (0.495, 0.505), then these may be considered as low confident, conflicting entities. In this way, less confident, conflicting, and high confident entities may be identified.

With continued reference to FIG. 3 and the sub-process-1 that is implemented by the entity and relation annotator 102, an output of the sub-process-1 performed by the entity and relation annotator 102 may include entities and predicted probabilities for an unseen corpus that is to be annotated.

With continued reference to FIG. 3, the entity and relation annotator 102 may implement a sub-process-2 to utilize an advanced deep learning process to learn entity relations from the historic annotations, and determine new annotations for completely new documents. In this regard, input to the sub-process-2 performed by the entity and relation annotator 102 may include relation annotated documents at 306, for example, from subject matter experts, which may include an initial corpus of semi-structured documents, predefined relations specific to a process. An example of such documents may include accounts payable finance domain with relations such as synonym, part-of, instance of, etc. In this regard, for example, with respect to FIGS. 5B and 5C, the lexical variations 'total due', 'balance due', 'account balance' etc., all may be related to one entity 'BalanceDue', may be denoted 'synonyms', and may be related with a 'synonym' relationship. Similarly in many of the invoice documents, the entity 'InvoiceNumber' may be referred to as 'reference number', 'account number', 'bill number' etc. All of these variations may be related in a 'synonym' relationship. The entity 'sub total' may be in relation with 'InvoiceTotal' through the 'hypernym' relationships. Likewise, there may be other relations such as instance-of, part-of, etc., relations among the entities in an invoice collection.

With continued reference to FIG. 3 and the sub-process-2 that is implemented by the entity and relation annotator 102, the entity and relation annotator 102 may utilize an existing relations annotation framework for entity detection from raw process documents with predefined relations. In this regard, a few raw samples of documents may be marked with respect to relations. The entity and relation annotator 102 may transform the entity-relation-annotated corpus into vector representations and set different parameters for a word2vec process and entity-relation embeddings. In this regard, for the examples of FIGS. 5A-5C, given the historical invoice corpus which is entity and relation annotated with predefined entities and relations covering different vendors similar to FIGS. 5A-5C, in order to cover all semantic variations of entities and relations, entity-relation embeddings may need to be learned from the corpus. Syntactic and semantic variations of these relations names denoted entity-relation embeddings may be learned through the semantic distribution process denoted word2vec. The word2vec process may learn semantic variations of entity-relations using shallow neural representation using a skip-gram based negative sampling technique. The word2vec process may generate a numerical weighted representation for each entity-relation by learning contexts based on the assumption that words that occur together tend to be similar semantically. The word2vec process may be trained on chunks of the historical corpus by representing each entity into a numerical word vector with the defined dimensions. Dimensions may refer to a number of entity semantic variations, and may be set to a [50-300] range during the training. The context window may also be specified for skip-gram models in the range of [1,10], and the word2vec process may be trained accordingly. In this way, the entity-relation annotated corpus may be transformed into entity-relation numeric continuous vectors including numerical weights used as disclosed herein for learning entities from the unseen corpus.

With continued reference to FIG. 3 and the sub-process-2 that is implemented by the entity and relation annotator 102, the entity and relation annotator 102 may implement bi-directional attention based LSTM sequential deep learning by considering entity embeddings as input representation, train and tune various parameters, and build the entity and relation annotation model 106 based on testing with a specified test set of documents. Given an unseen corpus that is to be annotated, the entity and relation annotation model 106 may determine relations among given entities. For each predicted relation, the entity and relation annotation model 106 may determine a confidence score in terms of predicted probabilities. The highest threshold using the entity-relation probabilities may be determined using a set of specified invoice samples where entity-relations are correctly tagged. Using these invoice samples as test set, corresponding probabilities may be predicted. The probabilities of all the entity-relations that are correctly predicted may be considered in increasing values order from the specified invoice samples, and the minimum probability where the entity prediction is correct may thus be obtained. This probability may be considered as a 'relation_confidence_threshold' for that entity-relation. In this manner, confidence thresholds may be determined for each entity-relation. Given the unseen invoice sample from a new vendor, using the trained entity and relation annotation model 106, the required entity-relations may be predicted with corresponding probabilities. If the entity 'InvoiceTotal' probability value is >=the relation_confidence_threshold, then it is deemed as correct entity. If the predicted probability value is lesser than the relation_confidence_threshold, then it is considered as a less confident entity, and may require review from a subject matter expert. In this way, less confident, and highly confident entity-relations may be identified.

With continued reference to FIG. 3 and the sub-process-2 that is implemented by the entity and relation annotator 102, an output of the sub-process-2 performed by the entity and relation annotator 102 may include relations and predicted probabilities for an unseen corpus that is to be annotated.

With continued reference to FIG. 3, at 308, the entity and relation annotator 102 may implement a sub-process-3 to identify highly confident and less confident entities and relations from the predicted entities determined by application of the entity and relation annotation model 106. In this regard, input to the sub-process-3 performed by the entity and relation annotation model 106 may include entities and relations, and corresponding confidence thresholds. The entity and relation annotation model 106 may identify a confidence threshold for entity prediction as '$E_{cf}$' and relation prediction as '$R_{cf}$'. The entity and relation annotation model 106 may set a high and low confidence thresholds for both entity and relation as hEcf, lEcf, hRcf, and lRcf, respectively. These thresholds may be determined based on a specified set of entities and relations. For example, the entity and relation annotation model 106 may consider the set of entities and relations that have high confidence values of hEcf>0.95 and hRcf>0.95, the set of entities and relations that have lower confidence values of lEcf<0.5 and lRcf<0.5, and the set of entities and relations that have relatively close confidence values of lE1cf−lE2cf=0.001. The entity and relation annotation model 106 may compile these types of entities and relations that have been identified based on application of the aforementioned confidence thresholds for further review. An output to the sub-process-3 performed by the entity and relation annotation model 106 may include marked and compiled entities and relations based on the filtering criteria defined by the aforementioned confidence thresholds, applied to the unseen corpus that is to be annotated.

With continued reference to FIG. 3, the entity and relation annotator 102 may implement a sub-process-4 to convert low confident predicted entities into annotatable coding into completely new raw documents in an annotation graphical user interface tool. If the entity and relation annotation model 106 emits low confident entities, then a corresponding value of the entity may be added into the dictionary of less confident entities with the offset (e.g., location of the entity in the invoice document). Further, for those entities that are in a low-confidence range, corresponding values may be highlighted, for example, in a 'red' color in the html version of the invoice, and subsequently, these entities may be reviewed by a subject matter expert.

With continued reference to FIG. 3 and the sub-process-4 that is implemented by the entity and relation annotator 102, an input to the sub-process-4 performed by the entity and relation annotator 102 may include the unseen corpus that is to be annotated, and a compiled list of entities and relations that is to be marked. The entity and relation annotator 102 may consider highly confident (e.g., >0.95) entities and relations, and encode and/or mark such entities with different tags (or colors) in the form of html/text document. The entity and relation annotator 102 may consider less confident (e.g., <0.5) entities and relations, and encode and/or mark such entities with different tags (or colors) in the form of html/text document. These latter entities and/or relations may be verified, for example, by a subject matter expert. The entity and relation annotator 102 may consider marginally and/or overlapping confident (e.g., difference ~0.001) entities and relations, and encode and/or mark such entities with different tags (or colors) in the form of html/text document, where these entities and/or relations may be verified, for example, by a subject matter expert. If the entity and relation annotation model 106 emits a low confident entity-relation, then the corresponding value of the entity-relation may be added into the dictionary of less confident entities with the offset (e.g., location of the entities in the invoice documents). Further for those entities that are in the low-confidence range, corresponding values may be highlighted, for example, in a 'red' color in the html version of the invoice. In the case of overlapping entity-relations, corresponding entity-relation pairs with the offsets may be added to the lookup, and these may be highlighted, for example, in can orange 'color'. The entities and relations that are highlighted in the 'red' and 'orange' colors in a graphical annotation tool may be reviewed by a subject matter expert. Once a subject matter expert verifies and corrects these entities and relations, this verified annotated corpus may be fed back to the entity and relation annotation model 106 to further refine the entity and relation annotation model 106. An output of the sub-process-4 performed by the entity and relation annotator 102 may include continuous annotation of documents until the entity and relation annotation model 106 includes an acceptable accuracy.

Thus, with respect to sub-processes 1-4 implemented by the entity and relation annotator 102, the entity and relation annotator 102 may determine, for each identified entity of the identified entities, an entity confidence score, and determine, for each identified relation of the identified relations between the entities, a relation confidence score. The entity and relation annotator 102 may identify, based on the entity confidence score, an entity that includes an entity confidence score that is less than an entity confidence score threshold, and identify, based on the relation confidence score, a relation that includes a relation confidence score that is less than a relation confidence score threshold. Further, the entity and relation annotator 102 may generate another inquiry (e.g., to a subject matter expert) for verification of the entity and the relation that respectively include the entity confidence score and the relation confidence score that are respectively less than the entity confidence score threshold and the relation confidence score threshold. The entity and relation annotator 102 may train, based on a response to the other inquiry for verification of the entity and the relation that respectively include the entity confidence score and the relation confidence score that are respectively less than the entity confidence score threshold and the relation confidence score threshold, the entity and relation annotation model 106.

Further, with respect to sub-processes 1-4 implemented by the entity and relation annotator 102, the entity and relation annotator 102 may determine, for each identified entity of the identified entities, an entity confidence score, and determine, for each identified relation of the identified relations between the entities, a relation confidence score. The entity and relation annotator 102 may identify entities for which a difference between entity confidence scores is less than a specified numerical value, and identify relations for which a difference between relation confidence scores is less than the specified numerical value. The entity and relation annotator 102 may generate another inquiry (e.g., to a subject matter expert) for verification of the entities for which the difference between the entity confidence scores is less than the specified numerical value, and the relations for which the difference between the relation confidence scores is less than the specified numerical value. The entity and relation annotator 102 may train, based on a response to the other inquiry for verification of the entities for which the difference between the entity confidence scores is less than the specified numerical value, and the relations for which the difference between the relation confidence scores is less than the specified numerical value, the entity and relation annotation model 106.

The entity and relation annotator 102 may thus address technical challenges associated with marking of key entities from an initial set of historical documents such as invoices, remittances, purchase orders, bank statements, etc., by using the entity and relation annotation model 106. In this regard, the marking process may be improved by seeking minimal assistance from subject matter experts for the potentially low confident and conflicted predicted entities, until the entity and relation annotation model 106 yields acceptable confidence results. These marked entities along with the corpus may be further used as a training corpus for building of knowledge extraction models, and for population of key entities into a backend enterprise resource planning system that may be referred to, for example, by domain experts.

An example of application of the entity and relation annotator 102 is disclosed herein with reference to FIGS. 4 and 5A-5C. The example of application of the entity and relation annotator 102 is disclosed herein in the area of finance and accounting, but may be applied to any other industry where information may need to be annotated to build a decision support system.

Figure 4:
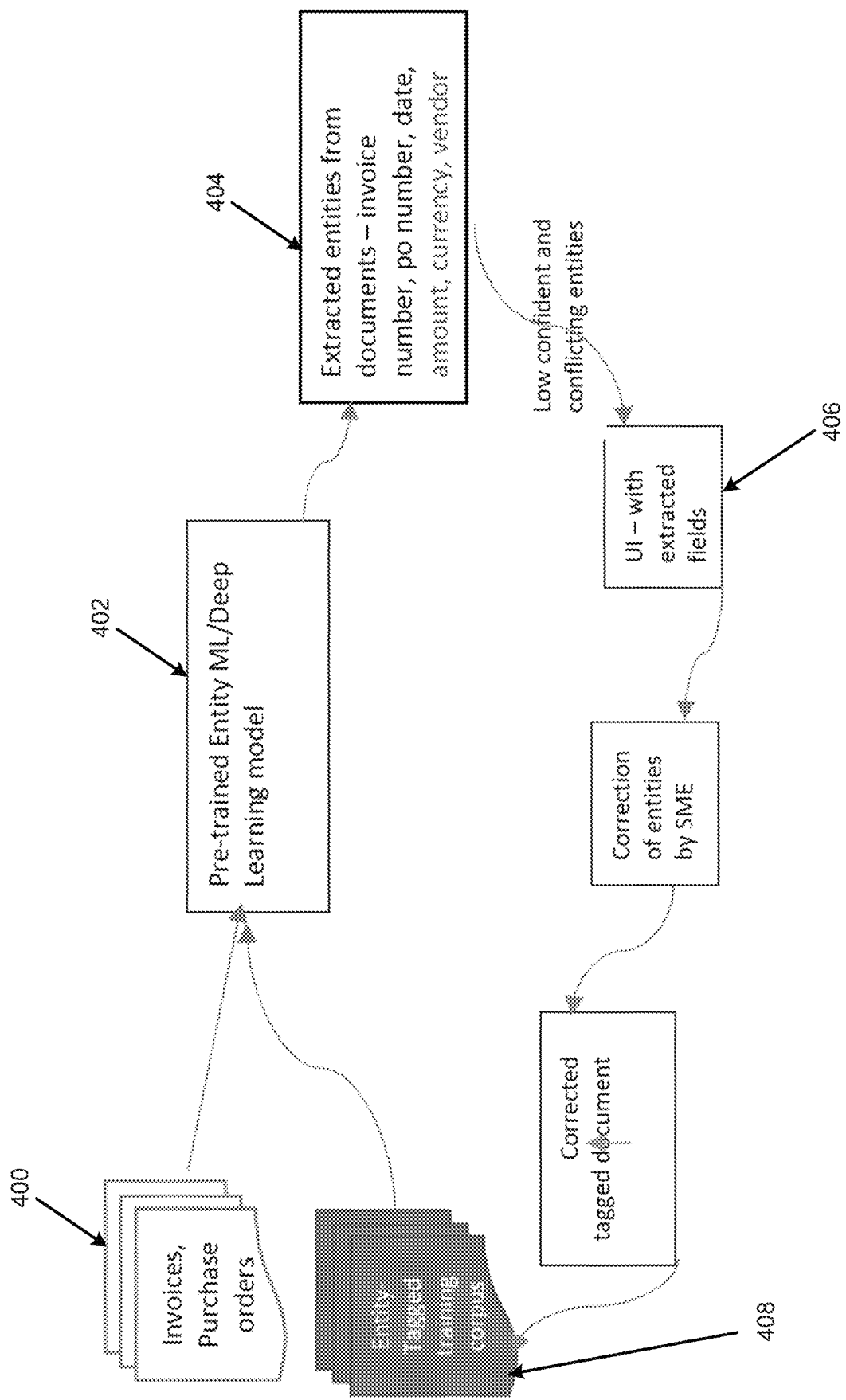
FIG. 4 illustrates an architectural diagram of a continuous entity and relation annotation framework for the artificial intelligence based corpus enrichment for knowledge population and query response apparatus of FIG. 1, in accordance with an example of the present disclosure.

FIG. 4 illustrates an architectural diagram of a continuous entity and relation annotation framework, in accordance with an example of the present disclosure. Further, FIGS. 5A-5C illustrate example invoices and corresponding potential entities that will be annotated with respect to operation of the entity and relation annotator 102, in accordance with an example of the present disclosure.

In the area of finance and accounting, invoices may be described as documents that may be used for payment processing. Entities such as invoice date, invoice amount, vendor name, invoice number, vendor address, account number, and item descriptions may represent some of the key points of information that may be captured to process invoices. In this regard, it is technically challenging and error-prone to capture such entities in a large number of invoices, and/or invoices that may include different formats. For example, invoices may be based on different templates and/or designs. In this regard, the entity and relation annotator 102 may annotate unseen and un-annotated documents. That is, the entity and relation annotator 102 may annotate the entities where the prediction accuracy is high. Thus, a user may annotate entities that include low accuracy, or are conflicting, to reduce the time needed to annotate all entities.

Referring to FIGS. 4-5C, for the example invoices shown in FIGS. 5A-5C, entities may include:

Invoice Sample—FIG. 5A
  InvoiceNumber: 00123
  PONumber: 123456
  InvoiceDate: Mar. 25, 2014
  InvoiceTotal: 328.65 USD
  Currency: USD
  VendorName: ABC Repair Inc.
  VendorAddress: 123, ABC Avenue, New York, N.Y. 10101.
Invoice Sample—FIG. 5B
  InvoiceNumber: INV123
  InvoiceDate: Nov. 1, 2001
  PONumber: 0000121212
  InvoiceTotal: 14522.04
  VendorName: ABC Ltd
  DueBalance: 14522.04

Invoice Sample—FIG. 5C
  InvoiceNumber: XYZ-009
  InvoiceDate: Aug. 31, 2011
  InvoiceTotal: 11812.50
  Currency: USD
  VendorName: XYZ Inc.
  DueDate: Sep. 1, 2011
  BalanceDue: 11,812.50

For FIGS. 5A, 5B, and 5C, the invoice samples may belong to three different vendors having different fromats and entitites scatterd across different segments. In the sample invoice for FIG. 5A, entitiy information may be encoded in the 'header', and in a textual table along with the 'terms and conditions' section. In the sample invoice of FIG. 5B, entity information may be encoded in the header and in multiple line-based tables. In this sample, the entity 'DueDate' is missing. In the sample invoice of FIG. 5C, entity information may be scattered across multiple line-tables, headers. The entity PONumber is missing and multiple dates and amounts are present. In this manner, the invoices may be different with respect to structure and presence of entities, and these differences may pose detection and extraction challenges for artificial intelligence models, which may require a sufficient number of invoice samples in a corpus.

Referring to FIG. 4, at 400, an input set of documents may be passed through the entity and relation annotation model 106 at 402 developed using machine learning and deep learning techniques as disclosed herein to extract entities along with the confidence scores for each entity. The output at 404 may be fed at 406 to a user interface system, where a user may correct any low confidence and conflicting entities. At 408, the corrected and tagged documents may be used to retrain the entity and relation annotation model 106. Each iteration may add new annotated documents to the training set, thereby increasing performance of the entity and relation annotation model 106.

Referring to FIGS. 5A-5C, assuming that the invoice amount is identified as 328.65 USD, invoice currency is identified as $USD, and vendor name is identified as ABC Repair with low confidence values of 0.5, these low confidence entities may be sent to a subject matter expert for correction, where the subject matter expert may tag these entities as 328.65 (deleting the currency), USD ignoring dollar symbol, and vendor name as ABC Repair Inc. by adding 'Inc.', respectviely. Thus, over multiple such documents, the entity and relation annotation model 106 may learn the patterns from correctly marked entities to make continuous improvements.

Each document (e.g., invoice) that is obtained for processing may be sent through the extraction process where the entities may be extracted using the entity and relation annotation model 106, and presented to a subject matter expert along with the document. In this regard, the subject matter expert may correct certain entities with low confidence values, and conflicting entities with marginally different confidence values. This process may continue with multiple iterations until a specified number of documents, such as invoices, are annotated for all of the entities.

Operation of the document categorizer 110 is described in further detail with reference to FIGS. 6-9C.

Figure 6:
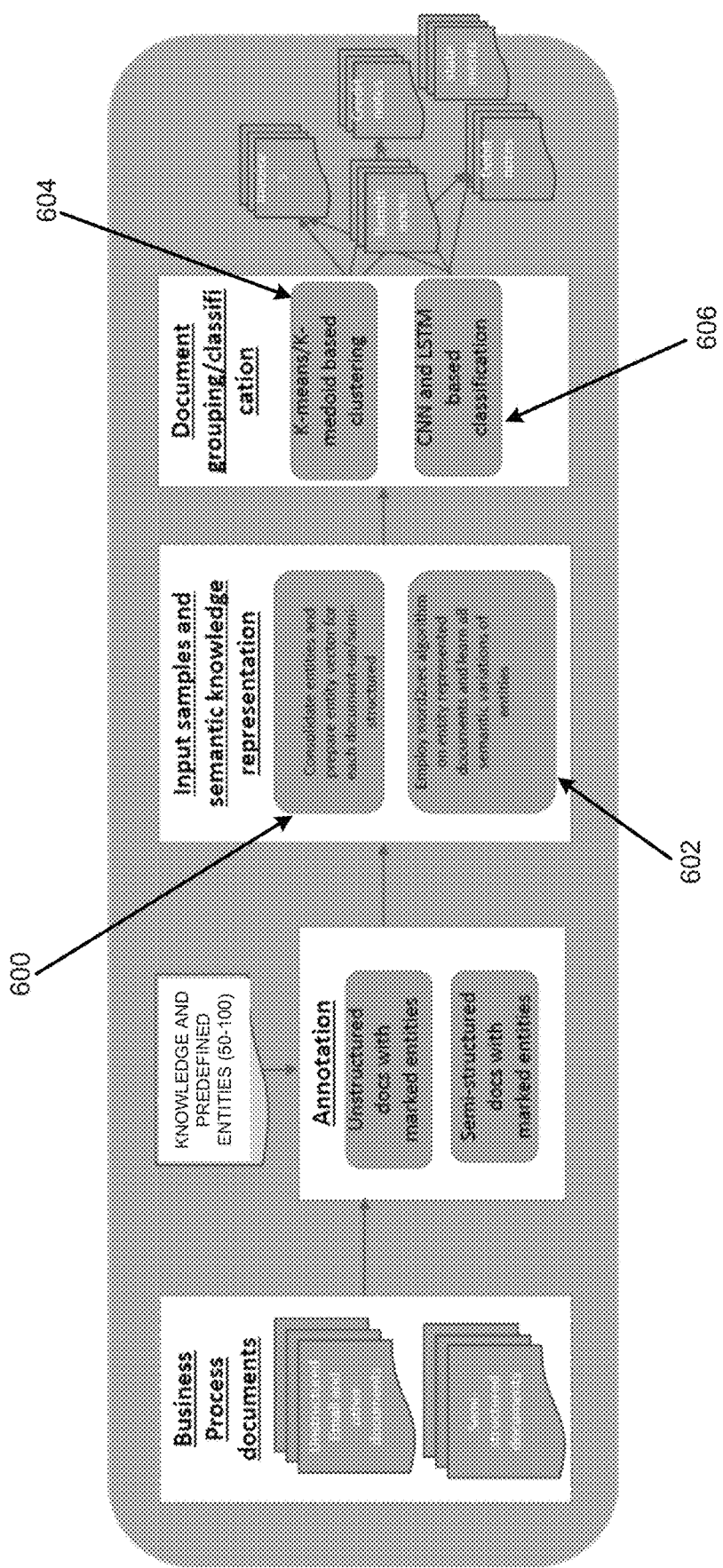
FIG. 6 illustrates an architectural diagram of a document categorizer of the artificial intelligence based corpus enrichment for knowledge population and query response apparatus of FIG. 1, in accordance with an example of the present disclosure.
Figure 7D:
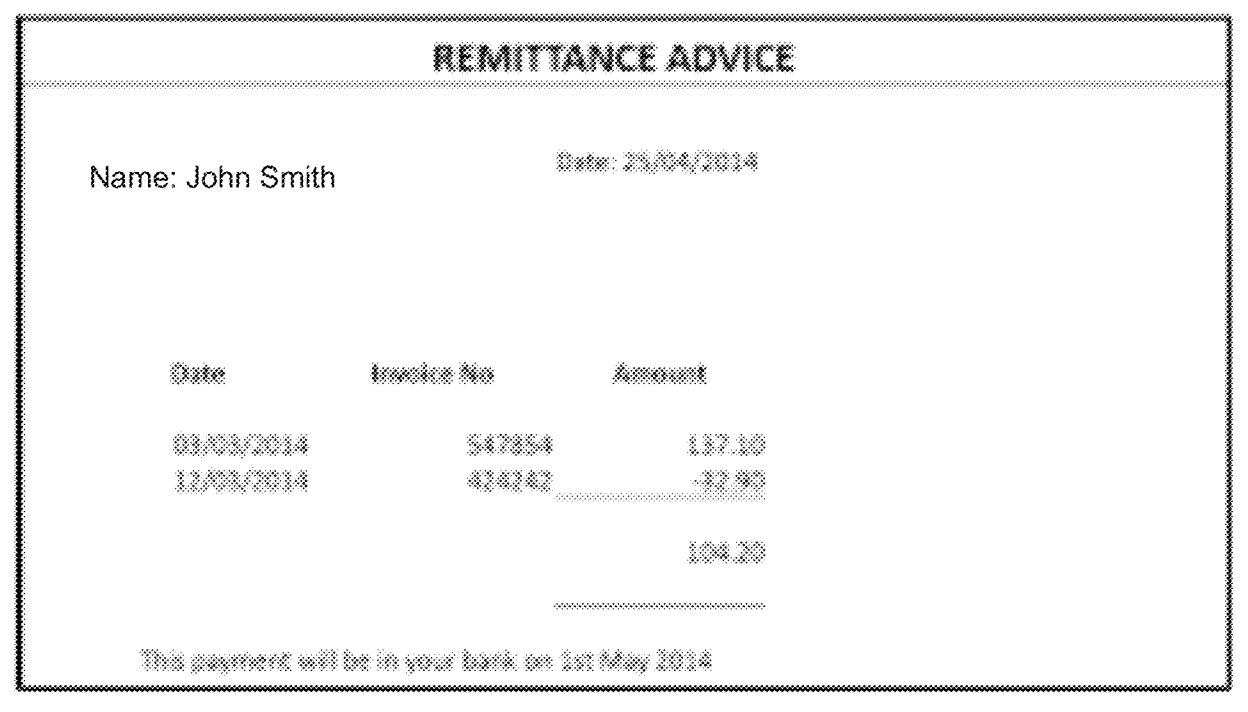

FIG. 6 illustrates an architectural diagram of the document categorizer 110, in accordance with an example of the present disclosure. FIGS. 7A-7E illustrate examples of invoices, credit notes, and remittances to illustrate operation of the document categorizer 110, in accordance with an example of the present disclosure.

Referring to FIG. 6, the document categorizer 110 may implement a natural language processing and deep learning-based entity and knowledge-driven fine-grained corpus categorization. With respect to document characterization, not all of the documents that are present in an initial corpus may need to be annotated. In this regard, the document categorizer 110 may categorize each document of the document set that is to be annotated into the aforementioned respective category of the plurality of categories. Further, the entity and relation annotator 102 may identify, based on application of the entity and relation annotation model 106 to the document set, entities and relations between the entities for each document of the document set to generate the annotated document set by identifying, based on application of the entity and relation annotation model 106 to documents of the identified category, entities and relations between the entities for each document of the identified category to generate annotated documents for the identified category.

According to examples disclosed herein, in accounts payables and receivables processes, the categorization of invoices and other types of documents, such as those illustrated in FIGS. 7A-7E, into payment documents and remittances may facilitate identifying which documents have sufficient samples and which documents do not have sufficient samples. Once these document categories are identified, corresponding document categories may be enriched subsequently using other techniques. The document categorizer 110 may identify and group various entity-represented fine-grained invoices and other types of documents into various categories (e.g., clusters) based on advanced deep learning techniques. In this regard, instead of encoding all of the information present in a raw form and grouping documents into clusters that are not accurate, and not interpretable and explainable, the document categorizer 110 may consider fine-grained entities and discard unwanted information from the documents. For the document categorizer 110, entities may represent data elements that include a meaning of the document, and that may facilitate distinguishing different types of payment documents accurately. The document categorizer 110 may incorporate semantic variations for the fine-grained entities. Thus, the document categorizer 110 may generate highly accurate, meaningful, and interpretable groups and/or classifications.

The document categorizer 110 may encode and represent each input document (e.g., invoice) present in the document set 108 (e.g., corpus) in terms of fine-grained entities. The document categorizer 110 may encode the training samples using semantic variations and compiled leveraging deep learning based word2vec techniques. The document categorizer 110 may implement a deep learning based LSTM technique to classify and/or cluster documents (e.g., invoices) into various groups and/or categories.

Referring to FIG. 6, the document categorizer 110 may implement a sub-process-1 to encode and represent each input document (e.g., invoice) present in the document set 108 (e.g., corpus) in terms of fine-grained entities. An input to the sub-process-1 performed by the document categorizer 110 may include an annotated document corpus with various process specific entities identified by subject matter experts. For the document categorizer 110, a corpus 'D' may include 'k' types of 'n' payment documents which are annotated by corresponding process subject matter experts with 'm' corresponding predefined set of entities. In this regard, the payment documents may refer to invoices, remittances, credit notes, bank statements, non-po invoices etc. The document categorizer 110 may consider all of the entity names defined by 'E', that are marked for the key vocabulary from each document. The entity names defined by 'E' may refer to the list of entities that refer to 'InvoiceNumber', 'InvoiceDate', 'InvoiceTotal', 'VendorName', 'DueDate', 'DueBalance', 'PONumber', 'Vendoraddress', 'Bankaddress', etc. The document categorizer 110 may discard all of the values of the entities that are marked from the corpus. In this regard, some of the segments such as 'terms and conditions' present in FIG. 5A may be excluded from the annotation and prediction task, and some of the entities such as 'ItemNumber' may also be discarded from the learning task. The document categorizer 110 may discard the rest of all the tokens from the corpus 'D', where tokens may refer to the vocabulary that is present in the discarded segment. Tokens may represent vocabulary that is separated by a space. The document categorizer 110 may consolidate all of the unique entities from the 'k' types of documents and denoted by 'm', where these unique entities may be <='m'. At 600, the document categorizer 110 may transform each entity tagged document in the corpus 'D' into high level entity vectors denoted by 'V'. In this regard, annotated documents may be transformed into word vectors as disclosed herein for entity embeddings using the word2vec process.

The document categorizer 110 may implement a sub-process-2 to learn entity semantic variations from the document set 108 (e.g., the corpus). An input to the sub-process-2 performed by the document categorizer 110 may include the previously determined entity vector representations from the sub-process-1 performed by the document categorizer 110. The document categorizer 110 may consider the corpus of documents transformed into entity vectors V. Each vector 'V' may include the dimension of 'm', where 'V' may refer to the vector dimension of entities. At 602, the document categorizer 110 may utilize a word2vec model with various window sizes on the entity vector corpus and train the word2vec model with 'skip gram' with negative samples. "Skip gram" with negative samples may refer to a methodology that is used in considering the context window for learning entity embeddings, where some of the consecutive tokens called grams may be skipped and co-occurrences of adjacent tokens may be considered for learning entity variations from the sentence contexts. The document categorizer 110 may specify the dimension of each entity embeddings and train the word2vec model. An output to the sub-process-2 performed by the document categorizer 110 is that all entity learned embeddings may include entity semantic variations where semantically similar entities may be grouped into the same vector with numerical value. In the case of invoice samples, the entities 'InvoiceNumber' and 'BillNumber' contexts may be grouped together into averaged vectors with numerical co-occurrence counts. For example, the entity 'InvoiceNumber' may have an example vector representation as V=[0.35,0.68,0.86,0.9] which is learned from all of its contexts present in the invoice samples.

The document categorizer 110 may implement a sub-process-3 to learn document groups and classifications from the entity-represented document vectors. In this regard, an input to the sub-process-3 performed by the document categorizer 110 may include entity document vector representations determined from the sub-process-1 performed by the document categorizer 110 and entity embeddings determined from the sub-process-2 performed by the document categorizer 110. With respect to learning document groups and/or clusters, the document categorizer 110 may consider the corpus of all the entity vectors transformed into entity embeddings. At 604, the document categorizer 110 may implement a K-means (or K-medoid) technique to learn the clusters. The document categorizer 110 may perform training until determining the 'K' types of learned document groups using the K-means technique. The document categorizer 110 may select 'K' number of groups dynamically utilizing the K-means technique.

With continued reference to FIG. 6, the document categorizer 110 may continue implementation of the sub-process-3 to learn document groups and/or classifications from the entity-represented document vectors. Entity-represented documents may represent entity-vectors that are learned using the historical corpus using the word2vec process as disclosed herein in learning entity embeddings as also disclosed herein. In this regard, input to the document categorizer 110 may include entity document vector representations determined from the sub-process-1 performed by the document categorizer 110 and entity embeddings determined from the sub-process-2 performed by the document categorizer 110. The document categorizer 110 may learn document classifications. The document categorizer 110 may consider the corpus of all the entity vectors transformed into entity embeddings. At 606, the document categorizer 110 may implement advanced deep learning classification methods such as CNN and/or LSTM. The CNN and/or LSTM processes may be adapted to the task of categorization using the entity annotated training corpus. Further, the document categorizer 110 may tune various learning parameters such as embedding size, batch size, iterations, drop out, etc. The parameters may be tuned using, for example, the grid-search process, and the parameters may be optimized during the training process and evaluated with a separate test set of invoice samples annotated with true entities. The document categorizer 110 may perform training until convergence of a learned entity document classification model 124. At 608, given a new document type, the learned entity document classification model 124 may accurately classify the document into one of the 'k' document types such as credit note, debit note, remittances, bank statement, expenses, etc.

Thus, with respect to sub-processes 1-3 implemented by the document categorizer 110, the document categorizer 110 may categorize each annotated document of the annotated document set into the respective category of the plurality of categories by transforming each annotated document of the annotated document set into an entity vector, grouping, based on the entity vector for each annotated document, semantically similar entities, and categorizing, based on the grouping, each annotated document of the annotated document set into the respective category of the plurality of categories.

With respect to the document categorizer 110, whereas the entity and relation annotator 102 addresses technical challenges related to efficient marking of entities, the document categorizer 110 addresses technical challenges related to what type of additional documents that need to be marked for entities based on available corpus using characterization (e.g., clustering and/or categorization) of an initial raw corpus of documents, such as invoices, statements, credit notes, remittances related to accounts payables and receivables in the finance and accounting domain. The characterization may identify and augment the missing documents specific to aforementioned types of documents to uniformly balance the training set to build further machine learning and deep learning models. The document categorizer 110 may utilize the entity-marked corpus for the characterization using advanced deep learning methods as disclosed herein.

An example of application of the document categorizer 110 is disclosed herein with reference to FIGS. 8 and 5A-5C. The example of application of the document categorizer 110 is disclosed herein in the area of finance and accounting, but may be applied to any other industry where information may need to be categorized to build a decision support system.

Figure 8:
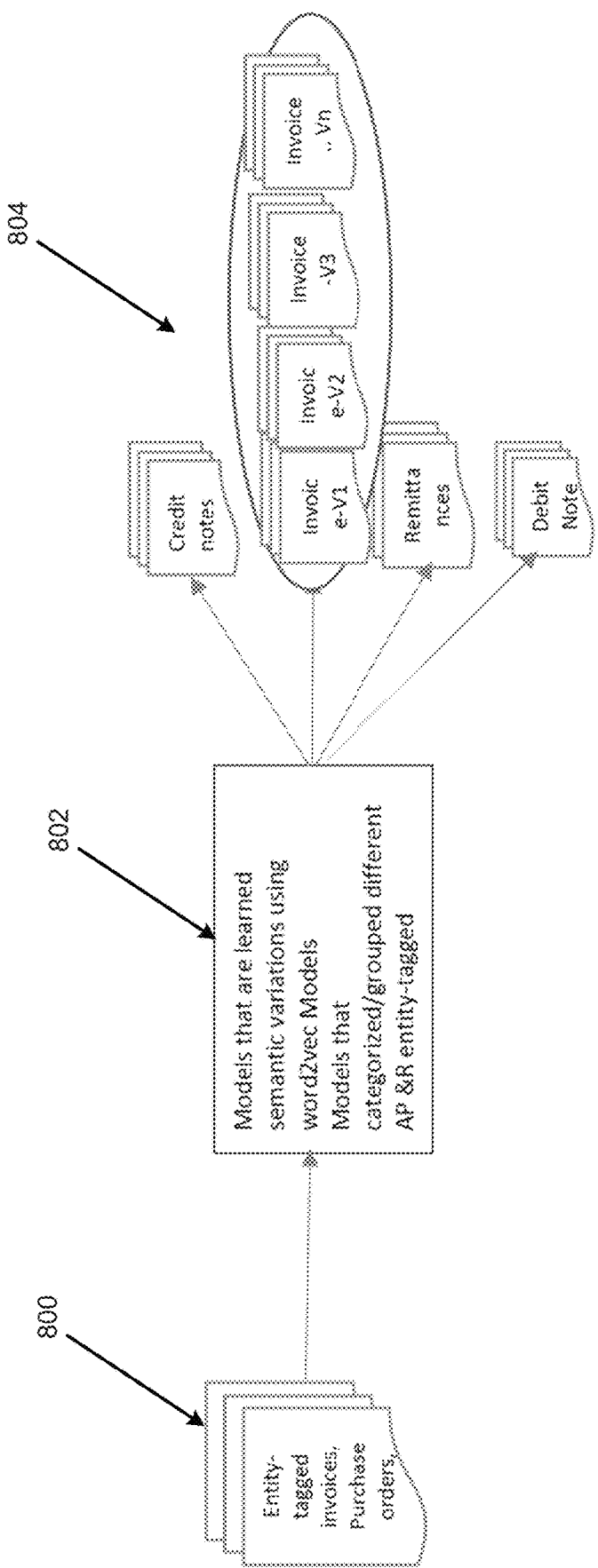
FIG. 8 illustrates a logical flow associated with operation of the document categorizer of the artificial intelligence based corpus enrichment for knowledge population and query response apparatus of FIG. 1, in accordance with an example of the present disclosure.

FIG. 8 illustrates a logical flow associated with operation of the document categorizer 110, in accordance with an example of the present disclosure. FIGS. 5A-5C, which were previously described with reference to the entity and relation annotator 102, also illustrate examples of types of account payable and receivable invoice documents from different vendors to illustrate operation of the document categorizer 110, in accordance with an example of the present disclosure.

In the area of finance and accounting, an account payable and receivable process may include several types of documents, such as invoices, credit notes, debit notes, remittances, etc. Further these documents may include different types of formats as these documents may be received from several thousands of vendors. It is technically challenging to efficiently and correctly categorize such documents into relevant categories of interest. In this regard, the document categorizer 110 may process these documents and classify them into a category of a specified number of categories using fine-grained pre-entity marked and/or annotated documents. Once the underlying types of documents are known, based on the threshold of documents that would be included per type, these documents may be further annotated by the entity and relation annotator 102.

Referring to FIG. 8, the document categorizer 110 may utilize deep learning on top of entity tagged documents at 800 by learning semantic variations of various entities using a deep-learning based word2vec process at 802, in addition with the categorization and/or grouping processes to efficiently categorize new documents or documents whose vocabulary is not previously known or seen. The categorized documents may be used to augment the existing corpus based on the type and required number of documents per group (e.g., threshold), and may be used for annotation.

As disclosed herein, at 800, an input to the document categorizer 110 may include entity tagged financial documents related to accounts payables and receivables, and compiled as disclosed herein. At 804, an output of the document categorizer 110 may include a document with a corresponding category associated with the document such as debit note, credit note, invoice, remittance in addition with its sub-type specific to certain vendors (e.g., Invoice-v1 (e.g., FIG. 5A), Invoice-v2 (e.g., FIG. 5B), Invoice-v3 (e.g., FIG. 5C), etc.).

Operation of the corpus generator and enricher 112 is described in further detail with reference to FIGS. 9 and 10.

Figure 9:
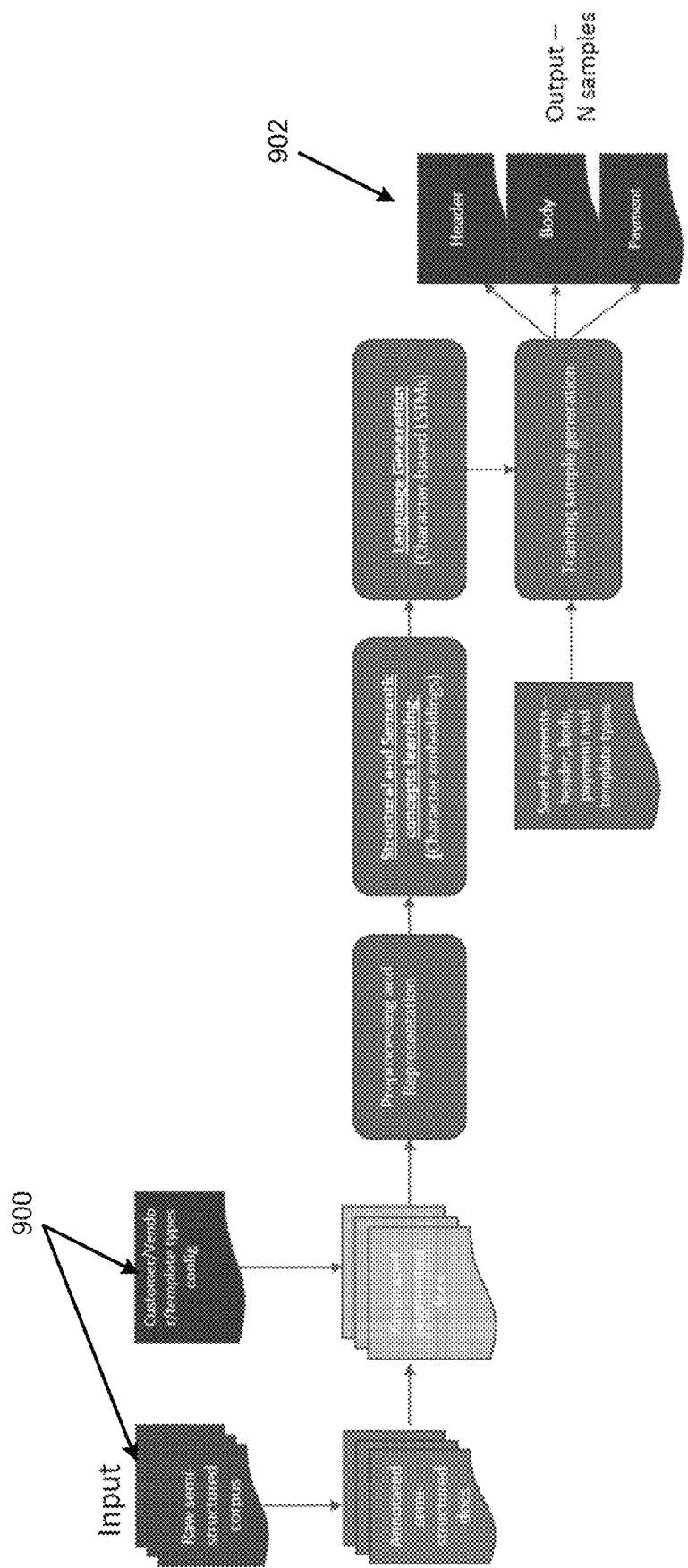
FIG. 9 illustrates an architectural diagram of a corpus generator of the artificial intelligence based corpus enrichment for knowledge population and query response apparatus of FIG. 1, in accordance with an example of the present disclosure.

FIG. 9 illustrates an architectural diagram of the corpus generator and enricher 112, in accordance with an example of the present disclosure.

Referring to FIG. 9, the corpus generator and enricher 112 may implement natural language processing and deep learning based corpus generation and enrichment based on character-based models. With respect to the corpus generator and enricher 112, artificial intelligence based solutions may be data-agnostic in that a relatively large data set may be needed for training the machine learning models. For example in financial and healthcare domains, obtaining client data for generating artificial intelligence based solutions is technically challenging in that not all clients may have data ready to be transferred for generation of artificial intelligence based solutions. As client data is generated from various customers and/or vendors, data may be encoded in various heterogeneous formats and/or templates, which may add inconsistencies to the performance of machine learning models. For example, in the accounts payable domain, sales invoices and purchase orders may come in different templates and/or formats from various customers in which different customers may use different entity and value encoding schemes, where due to the different types and corresponding documents, machine learning models may include limitations in generalized performance. Similarly, in the case of healthcare documents, patient or doctor prescriptions may be present in various formats. All of these documents may represent semi-structured documents with a known structure. As the data is not sharable across various organizations and/or clients, and as a single client and/or organization may not cover various formats of documents, building a generalized artificial intelligence machine learning system incorporating various types of documents to solve various tasks is technically challenging.

Vendors may use different templates to generate invoices, purchase orders, and/or health care documents. Additionally, vendors may encode data in these templates with various patterns. In this regard, it is technically challenging to obtain exhaustive documents that may cover all types of templates and pattern encodings from a single client, vendor, and/or customer. A single client and/or vendor may have none, or a limited number of samples specific to a particular template and/or data encoding, which may lead to skewed learning for machine learning models. Unstructured textual narrations may be generated from a seed text using natural language processing techniques such as n-grams. However, it is technically challenging to utilize these techniques with semi-structured documents. In this regard, given a document corpus from a single client/vendor, the corpus generator and enricher 112 may generate additional and a variety of synthetic training samples by implementing a natural language processing and deep learning based methodology using entity-annotated semi-structured documents to build generalized machine learning models to develop artificial intelligence-based solutions across various industries.

The corpus generator and enricher 112 may generate training samples from entity-annotated semi-structured documents. In this regard, the corpus generator and enricher 112 may implement a natural language processing-based methodology for decomposing, transforming, and representing entity-annotated documents into structure preserving and entity-value encoding formats for various customers and/or vendors. The corpus generator and enricher 112 may implement a natural language processing and deep learning-based methodology to learn structural and semantic variations of entities in terms of characters present in the semi-structured documents specific to a particular customer and segment using distributional word embeddings. The corpus generator and enricher 112 may implement natural language processing and deep learning-based language generation (NLG) methodology to jointly learn structure, entity, and tag encodings from a given customer and template specific representations using character-based language modeling based on long short-term memory deep neural networks (LSTMs). The corpus generator and enricher 112 may implement a natural language processing-based methodology to generate 'n' training samples for a given seed template segment (e.g., header, line-items (body) and payment section) using a jointly learned semi-structured generation model.

The corpus generator and enricher 112 may implement a sub-process-1 to perform the natural language processing-based methodology for decomposing, transforming, and representing entity-annotated documents into structure preserving and entity-value encoding formats for various customers and/or vendors. In this regard, referring to FIG. 9, at 900, an input to the sub-process-1 performed by the corpus generator and enricher 112 may include raw invoices and/or point of sale corpus, entity-annotated corpus, customer and/or vendor templates and/or format types. The raw corpus including the semi-structured documents may be entity-annotated with 'm' number of formats. These annotated documents may be of a type such as Hypertext Markup Language (HTML), Extensible Markup Language (XML), text, etc. The corpus generator and enricher 112 may generate, for the aforementioned identified category, additional annotated documents by segmenting the corpus into a plurality of sections to generate a preprocessed and segmented entity-annotated textual corpus. That is, the corpus generator and enricher 112 may segment the given entity tagged corpus into header, body, payment, and appendix and/or reference sections using, for example, conditional random field (CRF)-based segmentation. CRF may represent a sequential labelling approach where given the sequences, the CRF learns the corresponding entity labels from a large annotated corpus. CRF may represent a supervised probabilistic Markov graph modeling approach that can discriminate features conditionally, and captures long range dependencies among tokens and labels present in the sequences. Input to the CRF-based segmentation process may include a segment tagged document corpus. In this regard, all the segments may be excluded except the header, body, and payment sections. The corpus generator and enricher 112 may exclude all of the consecutive lines where there are no entity annotations present. The corpus generator and enricher 112 may retain all of the structural tokens such as spaces, tabs, and other punctuation symbols. An output of the sub-process-1 performed by the corpus generator and enricher 112 may include a preprocessed and segmented entity-annotated textual corpus.

The corpus generator and enricher 112 may implement a sub-process-2 to perform the natural language processing and deep learning-based methodology to learn structural and semantic variations of entities in terms of characters present in the semi-structured documents specific to a particular customer and segment using distributional word embeddings. In this regard, an input to the sub-process-2 performed by the corpus generator and enricher 112 may include the segmented and preprocessed semi-structured corpus obtained from the sub-process-1 performed by the corpus generator and enricher 112. The corpus generator and enricher 112 may consider each segment (e.g., header, body, and payment sections from each document). The corpus generator and enricher 112 may generate, for the aforementioned identified category, additional annotated documents by transforming each segment of the preprocessed and segmented entity-annotated textual corpus into a character representation to generate a plurality of character representations, consolidating, based on the character representations, segments of the preprocessed and segmented entity-annotated textual corpus, and learning, from each segment of the segments, character embeddings. That is, the corpus generator and enricher 112 may transform each segment into character representation with context window of size 'w', and specify the n-gram lengths. In this regard, given each sequence, tokens in the sequence may be separated into characters using a tokenization process, and on top of these character represented sequences, the word2vec process may be trained with various character context windows [1,100], in a similar manner to the learning entity embedding vectors disclosed herein. The corpus generator and enricher 112 may consolidate all the segments (e.g., headers, bodies, and payment sections from the character representations). The corpus generator and enricher 112 may apply the deep-learning based word2vec distributional process, except for on characters, which may be similar to applying the word2vec process on entities as disclosed herein. The corpus generator and enricher 112 may learn character embeddings from each segment. Character embeddings may refer to numerical vector representations learned from various character contexts. For example, the 'InvoiceNumber' entity value may be represented with a sequence of characters, and each character may be encoded in numerical vector form similar to entity vectors as disclosed herein. An output of the sub-process-2 performed by the corpus generator and enricher 112 may include character embeddings learned for each segment (e.g., header, body and payment sections).

The corpus generator and enricher 112 may implement a sub-process-3 to perform the natural language processing and deep learning-based language generation (NLG) methodology to jointly learn structure, entity, and tag encodings from a given customer and template specific representations using character-based language modeling based on long short-term memory deep neural networks (LSTMs) and/or attention-based Info-generative adversial neural networks (GANs). In this regard, an input to the sub-process-3 performed by the corpus generator and enricher 112 may include header, body, and payment segments (e.g., character represented; segment specific character embeddings and entity tags). The corpus generator and enricher 112 may implement a character-based deep learning-process, such as attention-based Info-GANS, which may be adapted to an invoice sample corpus to generate the new invoice samples including various segments. In this regard, inputs may include header, body, and payment segments along with entity tags. The corpus generator and enricher 112 may model tasks as a language generation problem using generator and adversial, attention-based information networks to generate new invoice samples based on learned invoice segments using an advertial attention-based deep neural networks technique. In this regard, the advertial attention-based deep neural networks technique may be trained on top of annotated corpus to learn the character sequences corresponding to each segment of the invoice similar to translating the source language of sentences into the target language with character sequences. The corpus generator and enricher 112 may transform these input channels into character represented embeddings, for example, with various sizes [50, 100, 200, 300], and change various parameters such as batch size, activation, and drop out functions. In this regard, character represented embeddings may refer to numerical semantic vector representations that are learned using the word2vec technique on the corpus, and are used as a training corpus. The corpus generator and enricher 112 may train the character-based deep learning-process, and learn the various entities, formats, and segments.

The corpus generator and enricher 112 may implement a sub-process-4 to perform the natural language processing-based methodology to generate 'n' training samples for a given seed template segment (e.g., header, line-items (body) and payment section) using a jointly learned semi-structured generation model learned from the sub-process-3 performed by the corpus generator and enricher 112. In this regard, an input to the sub-process-4 performed by the corpus generator and enricher 112 may include a seed invoice with various segments and 'n' template types (e.g., number of required training samples). The template may refer to invoice sample formats specific to each vendor. The templates may vary from vendor to vendor, and include various structural and content variations as shown in FIGS. 5A-5C. The corpus generator and enricher 112 may generate, for the aforementioned identified category, additional annotated documents by ascertaining a seed document, segmenting the seed document into another plurality of sections, transforming each segment of the segmented seed document into character represented vector embeddings, generating a plurality of corresponding segments specific to each transformed segment of the segmented seed document, and generating, based on the plurality of corresponding segments and the learned character embeddings, the additional annotated documents. That is, the corpus generator and enricher 112 may segment the given seed invoice (or purchase order document), for example, into header, body, and payment sections. The corpus generator and enricher 112 may transform each segment into character represented vector embeddings, where entities and tokens present in each segment may be converted into character vector representations as disclosed herein. The corpus generator and enricher 112 may apply the learned language model from the sub-process-3 performed by the corpus generator and enricher 112 on each segment. The corpus generator and enricher 112 may generate n-corresponding segments specific to each segment. The corpus generator and enricher 112 may combine header, body, and payment sections specific to the n targeted templates and generate 'n' training samples. At 902, an output to the sub-process-4 performed by the corpus generator and enricher 112 may include 'n' training samples with tagged entities. The training samples may refer to invoice samples for FIGS. 5A to 5C with the listed entities that are marked with the predefined set of entities as disclosed herein.

The corpus generator and enricher 112 may thus address technical challenges with respect to generation of invoice documents both in raw form and annotated from the initial set of historical semi-structured process documents. In this regard, the corpus generation and enrichment may be applicable across domains such as finance, healthcare, etc. Once various document types and/or groups from the document categorizer 110 are identified from the entity-annotated documents, the corpus generator and enricher 112 may identify a new set of entity-annotated invoice documents to fill the counts of the documents under each type of document groups which are lacking, and enrich the corpus sufficiently to build learning based knowledge extraction models.

Figure 10:
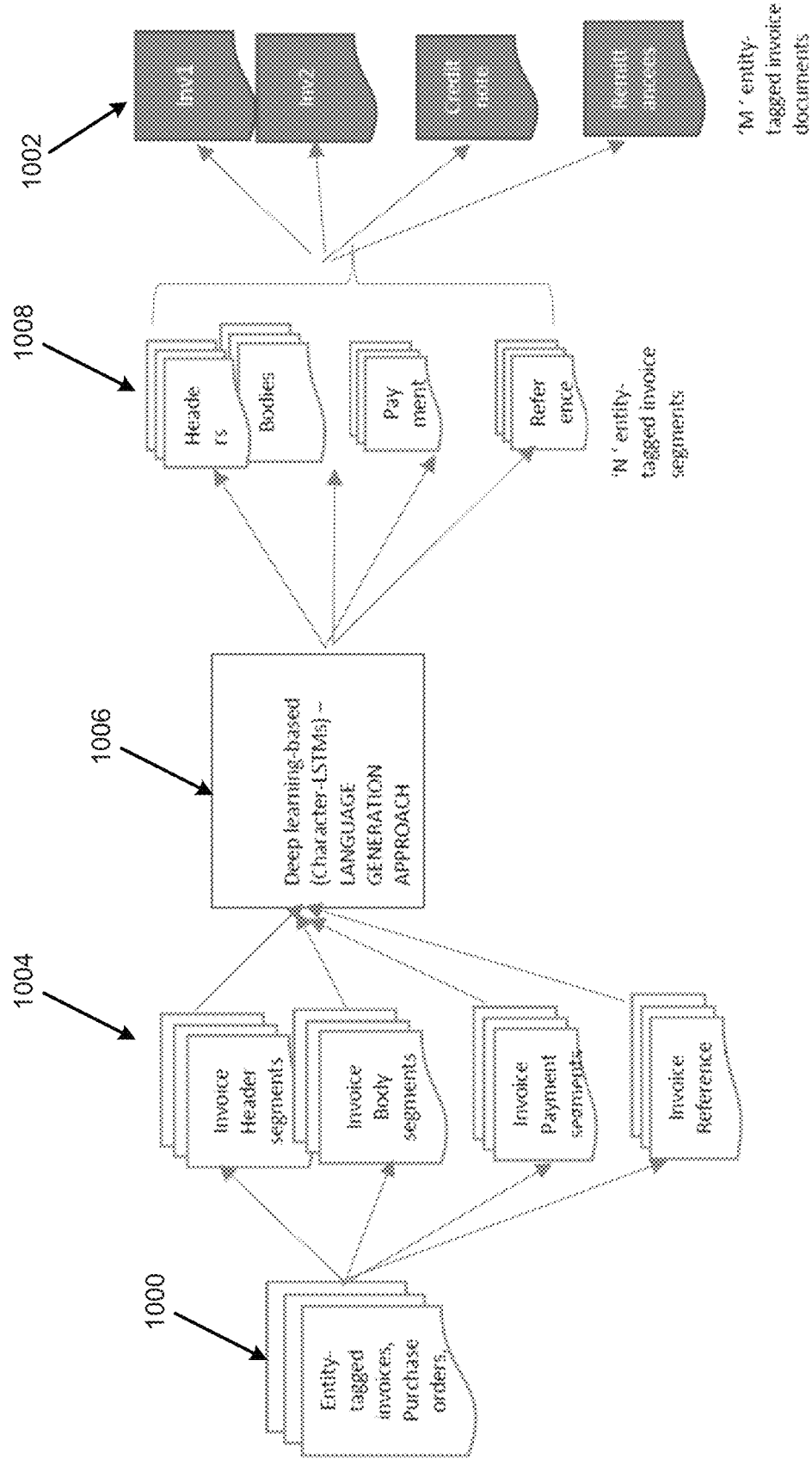
FIG. 10 illustrates a logical flow associated with operation of the corpus generator and enricher of the artificial intelligence based corpus enrichment for knowledge population and query response apparatus of FIG. 1, in accordance with an example of the present disclosure.

FIG. 10 illustrates a logical flow associated with operation of the corpus generator and enricher 112, in accordance with an example of the present disclosure.

Referring to FIG. 10, at 1000, an input to the corpus generator and enricher 112 may include a template (e.g., vendor specific document type), and/or categorized and/or grouped entity-annotated documents obtained from the document categorizer 110. At 1002, an output of the corpus generator and enricher 112 may include a set of different variations of the document for the provided vendor-specific template. The corpus generator and enricher 112 may identify various templates for the document type and fetch samples (e.g., one or two) each for a template. The corpus generator and enricher 112 may annotate the samples with the entities that occur in the documents together with the plausible locations of change. The corpus generator and enricher 112 may accept the templates and corresponding entities, and generate the various combinations of the entity data using deep learning-based language generation. In this manner, the initial template may be used to represent the variations in data.

Referring to FIG. 10, with respect to an example of operation of the corpus generator and enricher 112, given an invoice document at 1000, at 1004, the invoice document may be decomposed into header, body, payment, and reference sections. The header may include, for example, invoice number, date, purchase order number, etc. details. The body may include the item description including item attributes, date, etc. details. The payment section may include the total amount, tax, discount, and bank details. The reference section may include terms and conditions and other invoice specific contract details. From the header segment, for the entity named "InvoiceDate", and payment section, for the entity "InvoiceTotal", "InvoiceDate" may appear in the format MM/DD/YYYY, and "InvoiceTotal" may include digits with a currency sign before or after the value (e.g., 200 USD, $10, 19.00), etc. These components of the documents may be annotated with the corresponding entities. From the collection of invoice documents (e.g., 10,000 documents in the finance and accounting domain), all the segments may be identified, the entities may be marked, and corresponding types of documents may be identified. All of these invoice document segments and corresponding template types may be forwarded to the deep learning based word2vec model, and this model may learn all the semantic variations of segments (e.g., structure and content). Thereafter, at 1006, the character represented deep learning-based long short-term memory networks (LSTMs) may be applied to learn the structure of the segment, entity types, and corresponding values related to a given template. In this regard, different variations of patterns specific to a given set of entities may be learned. For example, as the month takes 1-12 as values, training samples may be generated with various values in month, date, and year. The same approach may be followed with the other entities. When annotating each such entity, the possible range of values may be specified so as to operate as a seed for generating the different variations of training data. This approach may be followed in cases where there is limited training data available for some of the documents. At 1008, given any vendor-template-type, a required number of invoice segments such as header, body, payment, and reference sections may be generated. A complete invoice document may be generated by combining all of these segments, and at 1002, the corpus generator and enricher 112 may generate a specified number of documents for each template (e.g., 10 per template), to cover various variations. Further, these documents may be added to the existing corpus under the document group and/or type for which a number of available documents is less than a specified number of documents. In this manner, a given entity annotated corpus may be enriched with additional samples.

An example of application of the apparatus 100 with respect to accounts payables and receivables in the finance domain is described.

Initially, a relatively small corpus of invoices and emails may be received, for example, from a client. The apparatus 100 (e.g., the entity and relation annotator 102) may annotate and enrich the document set 108 (e.g., the corpus) so that rapid information extraction models may be built for implementing tasks in various finance processes. A predefine set of entities and relations may be ascertained from the domain, for example, by subject matter experts. Entities and relations may be marked from the available corpus. The annotated and/or marked corpus may be forwarded to natural language processing and deep learning based information extraction models. Entities and relations with certain confidence values may be determined. Based on confidence thresholding as disclosed herein, the entities and relations that need to be verified and that do not need to be verified may be isolated. The verifiable entities and relations (e.g., corresponding documents) may be sent to a subject matter expert. The verified documents may be categorized (e.g., by the document categorizer 110) into invoice, credit notes, remittances, etc., based on the entity-driven categorization process, and the category of documents that needs to be enriched may be identified. Verified documents may be added back to the existing trainset to improve the aforementioned models. Documents that are to be annotated may be obtained. This process may continue until accuracy of the model as disclosed herein improves.

Figure 11:
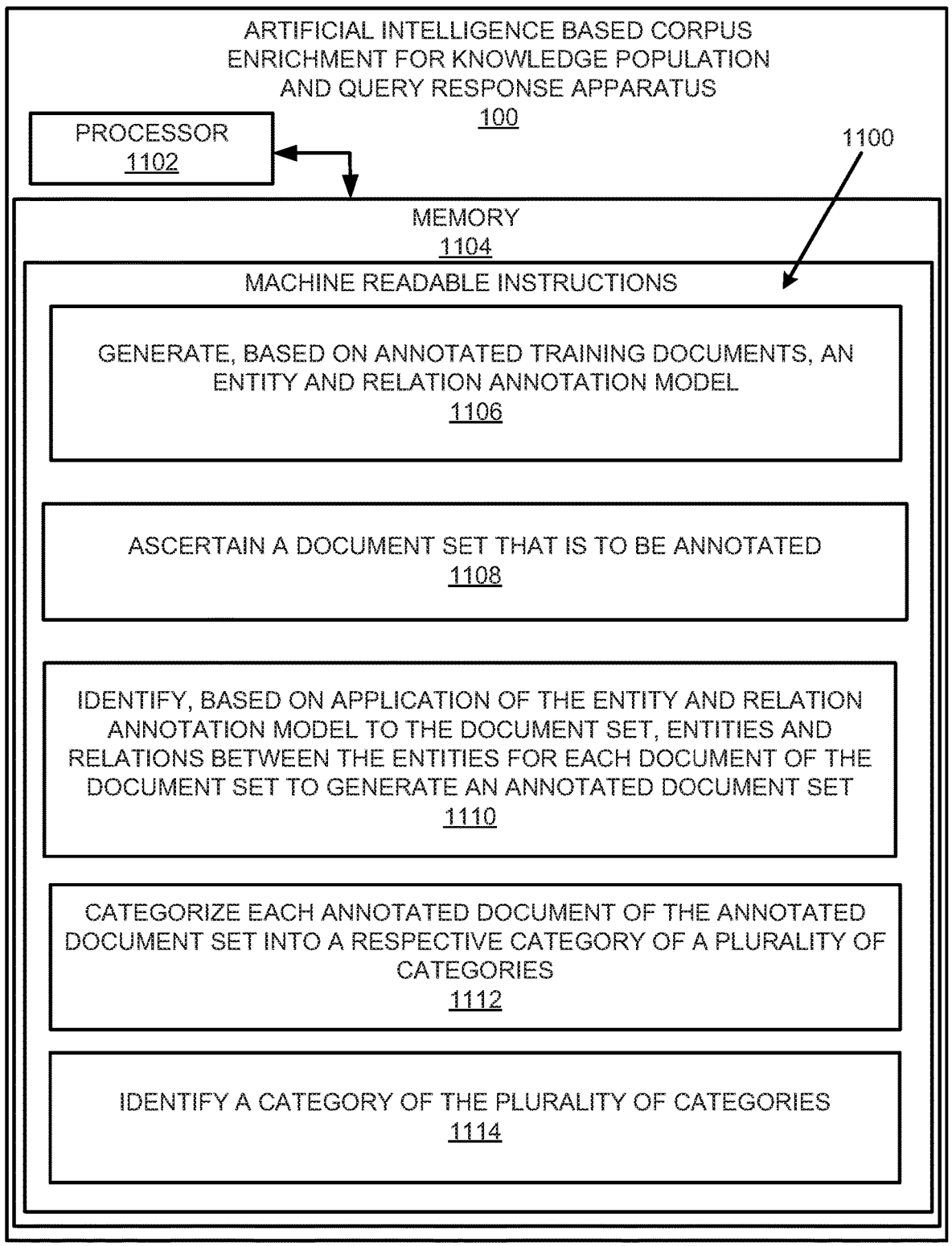
FIG. 11 illustrates an example block diagram for artificial intelligence based corpus enrichment for knowledge population and query response in accordance with an example of the present disclosure.
Figure 11:
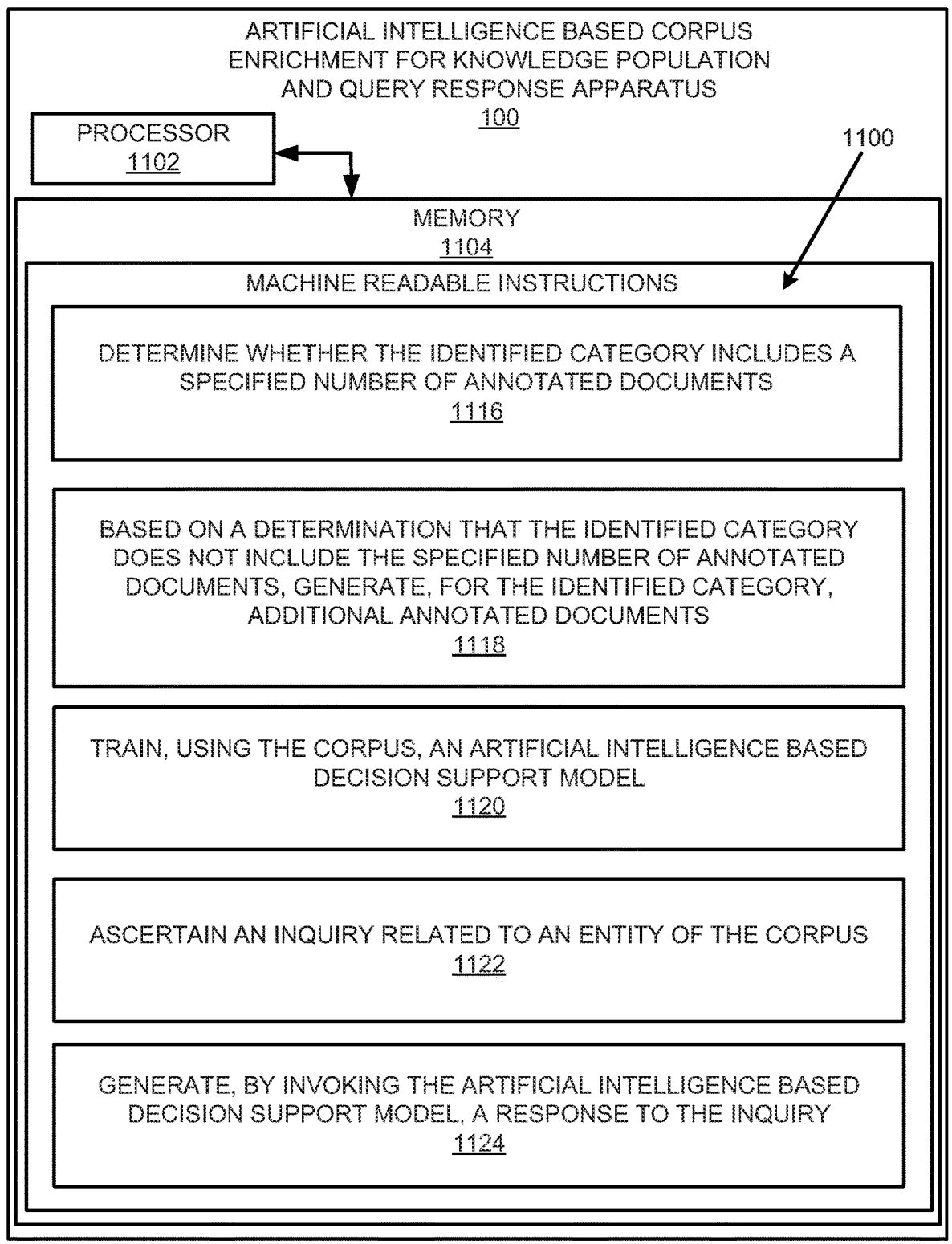
Figure 12:
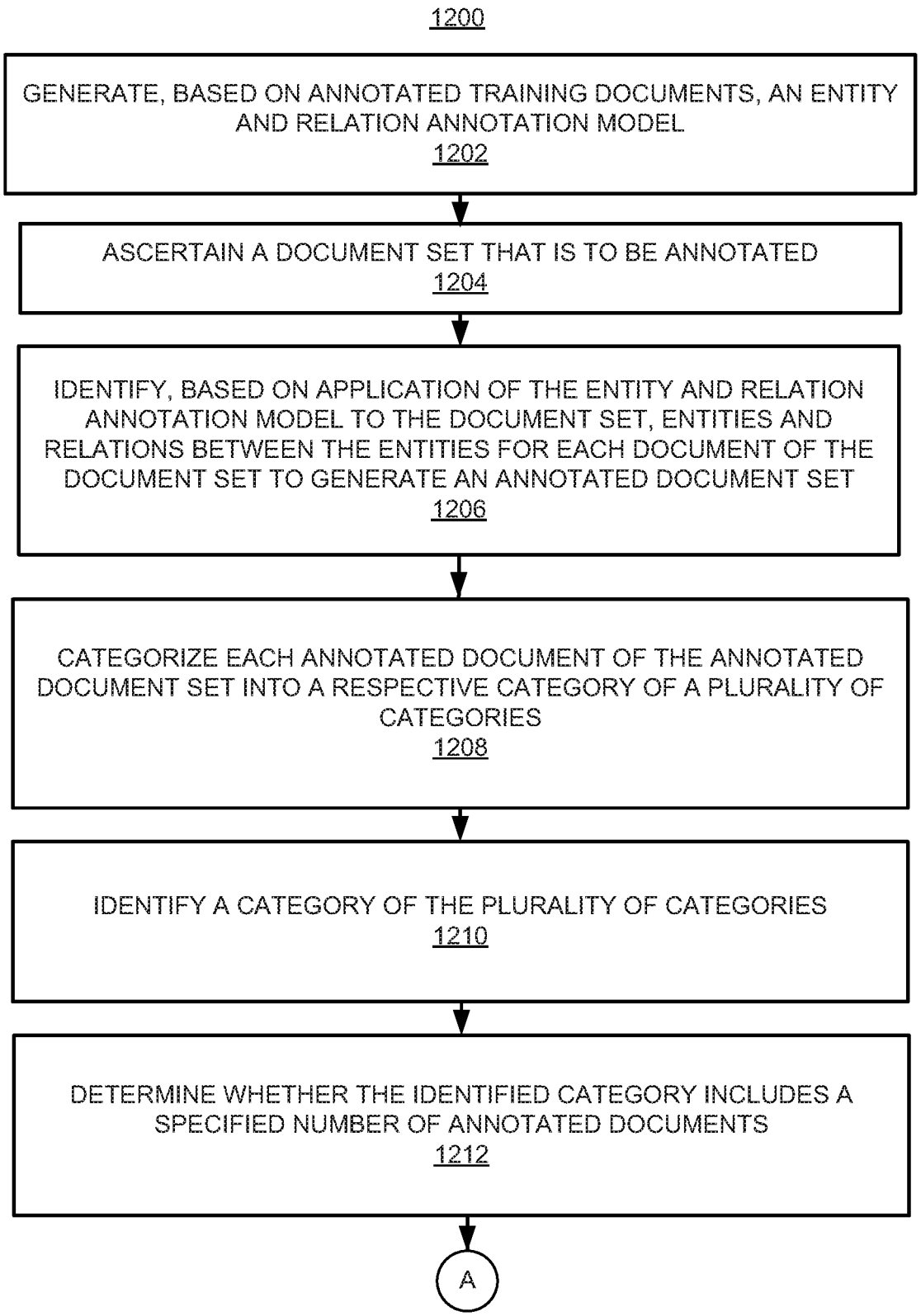
FIG. 12 illustrates a flowchart of an example method for artificial intelligence based corpus enrichment for knowledge population and query response in accordance with an example of the present disclosure.
Figure 12:
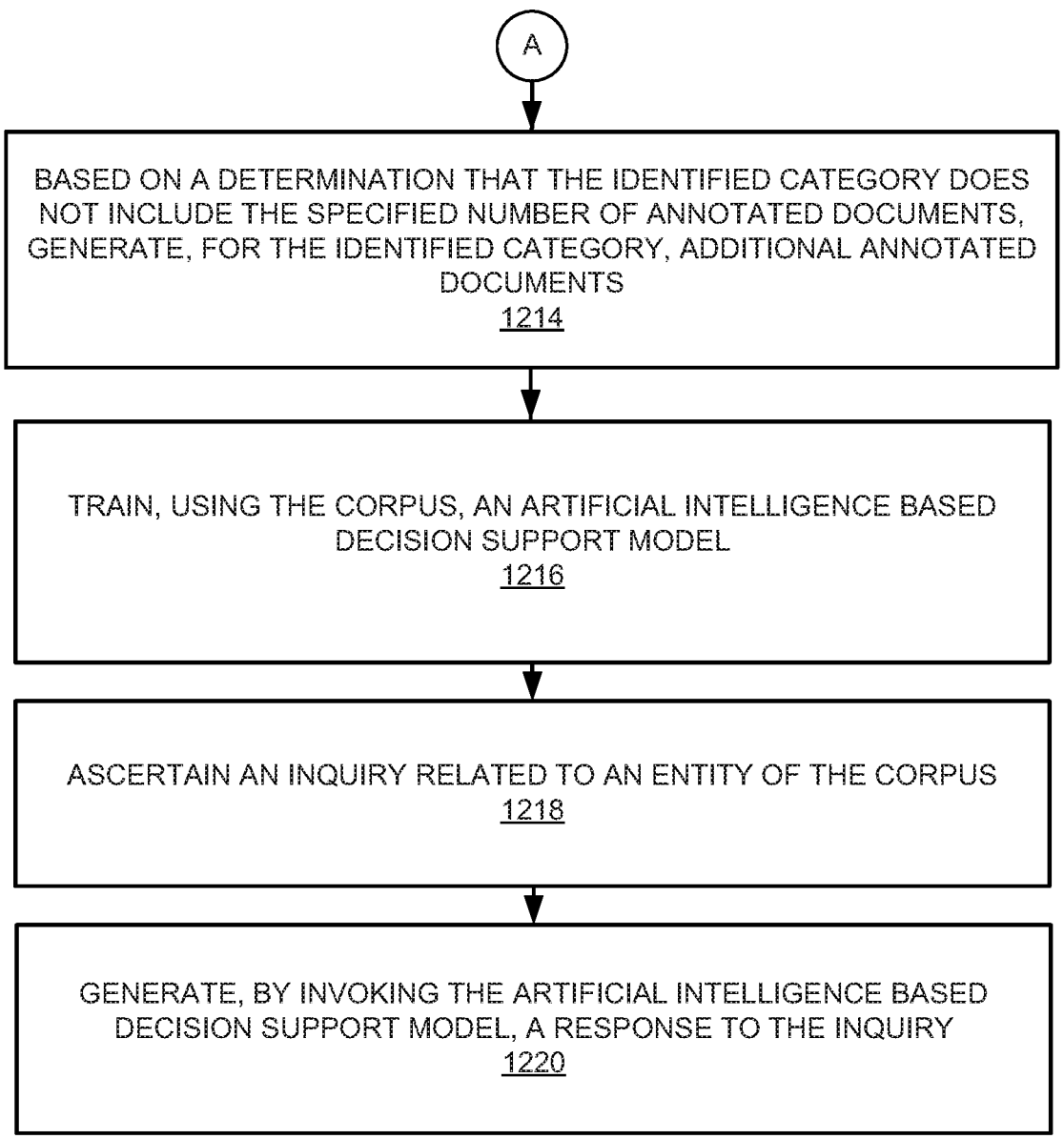
Figure 13:
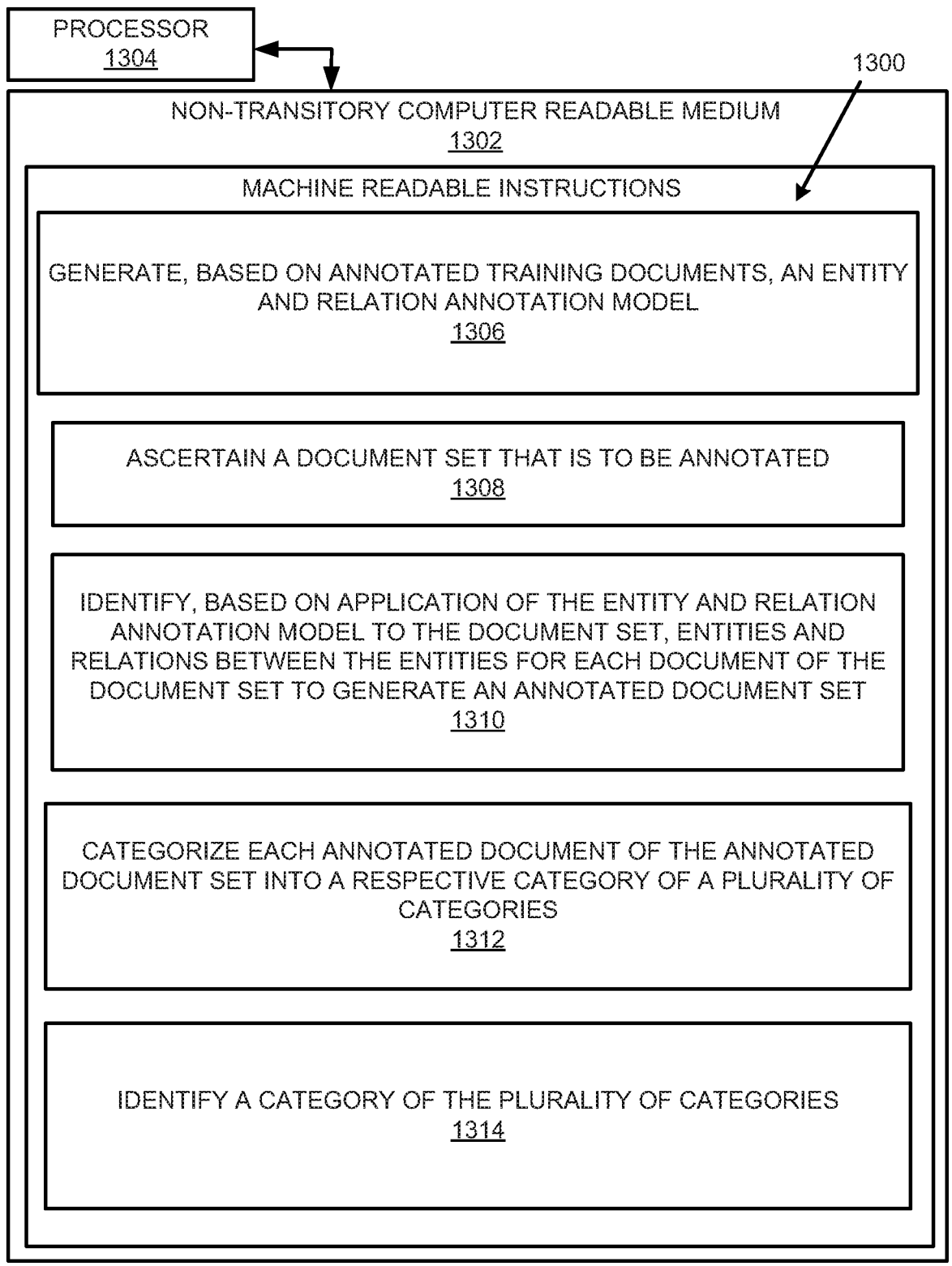
FIG. 13 illustrates a further example block diagram for artificial intelligence based corpus enrichment for knowledge population and query response in accordance with another example of the present disclosure.
Figure 13:
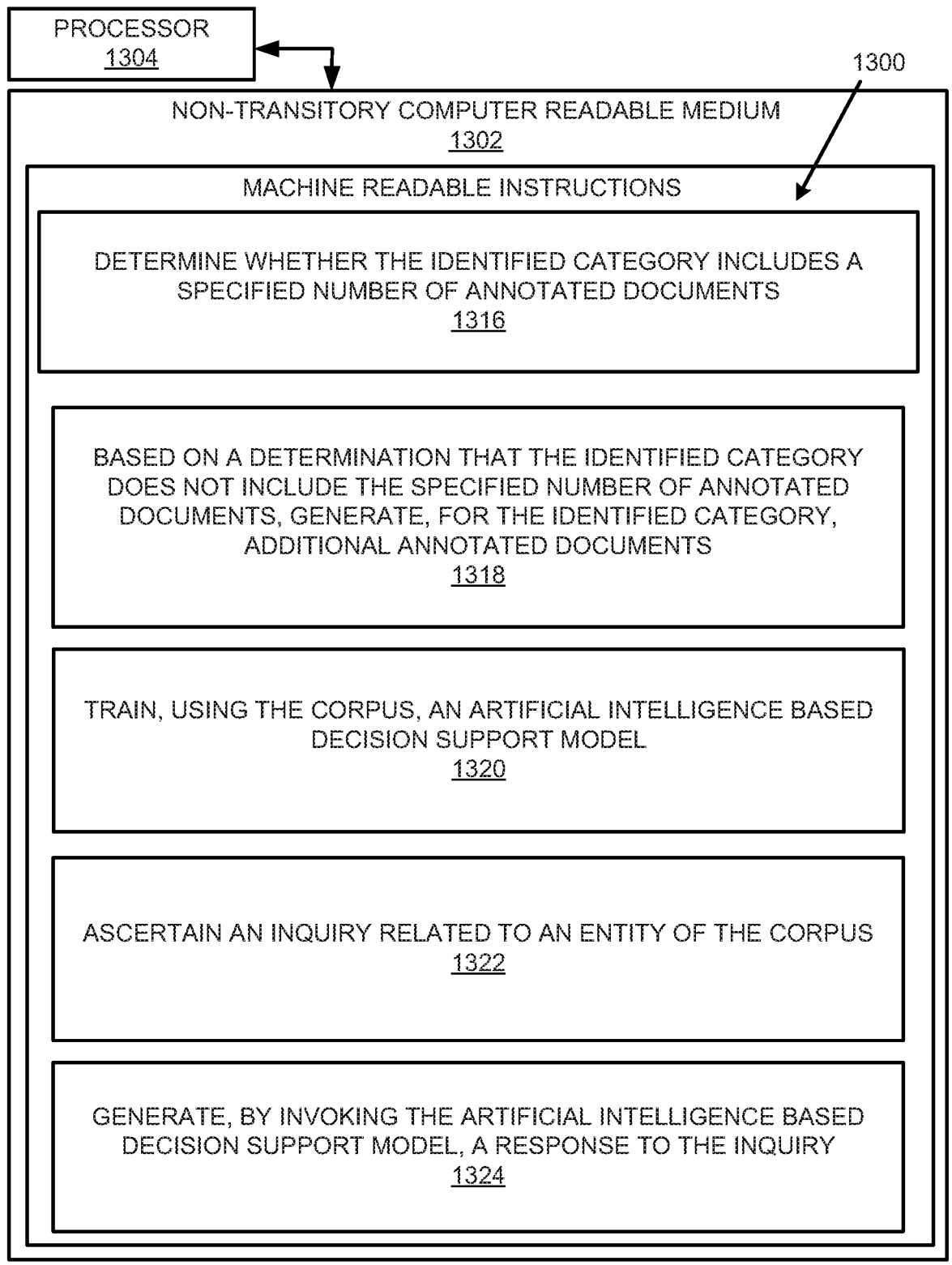

FIGS. 11-13 respectively illustrate an example block diagram 1100, a flowchart of an example method 1200, and a further example block diagram 1300 for artificial intelligence based corpus enrichment for knowledge population and query response, according to examples. The block diagram 1100, the method 1200, and the block diagram 1300 may be implemented on the apparatus 100 described above with reference to FIG. 1 by way of example and not of limitation. The block diagram 1100, the method 1200, and the block diagram 1300 may be practiced in other apparatus. In addition to showing the block diagram 1100, FIG. 11 shows hardware of the apparatus 100 that may execute the instructions of the block diagram 1100. The hardware may include a processor 1102, and a memory 1104 storing machine readable instructions that when executed by the processor cause the processor to perform the instructions of the block diagram 1100. The memory 1104 may represent a non-transitory computer readable medium. FIG. 12 may represent an example method for artificial intelligence based corpus enrichment for knowledge population and query response, and the steps of the method. FIG. 13 may represent a non-transitory computer readable medium 1302 having stored thereon machine readable instructions to provide artificial intelligence based corpus enrichment for knowledge population and query response according to an example. The machine readable instructions, when executed, cause a processor 1304 to perform the instructions of the block diagram 1300 also shown in FIG. 13.

The processor 1102 of FIG. 11 and/or the processor 1304 of FIG. 13 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1302 of FIG. 13), such as hardware storage devices (e.g., RAM (random access memory), ROM (read only memory), EPROM (erasable, programmable ROM), EEPROM (electrically erasable, programmable ROM), hard drives, and flash memory). The memory 1104 may include a RAM, where the machine readable instructions and data for a processor may reside during runtime.

Referring to FIGS. 1-11, and particularly to the block diagram 1100 shown in FIG. 11, the memory 1104 may include instructions 1106 to generate (e.g., by an entity and relation annotator 102 that is executed by at least one hardware processor), based on annotated training documents 104, an entity and relation annotation model 106.

The processor 1102 may fetch, decode, and execute the instructions 1108 to ascertain (e.g., the entity and relation annotator 102 that is executed by the at least one hardware processor), a document set 108 that is to be annotated.

The processor 1102 may fetch, decode, and execute the instructions 1110 to identify (e.g., by the entity and relation annotator 102 that is executed by the at least one hardware processor), based on application of the entity and relation annotation model 106 to the document set 108, entities and relations between the entities for each document of the document set 108 to generate an annotated document set.

The processor 1102 may fetch, decode, and execute the instructions 1112 to categorize (e.g., by a document categorizer 110 that is executed by the at least one hardware processor), each annotated document of the annotated document set into a respective category of a plurality of categories.

The processor 1102 may fetch, decode, and execute the instructions 1114 to identify (e.g., by a corpus generator and enricher 112 that is executed by the at least one hardware processor), a category of the plurality of categories.

The processor 1102 may fetch, decode, and execute the instructions 1116 to determine (e.g., by the corpus generator and enricher 112 that is executed by the at least one hardware processor), whether the identified category includes a specified number of annotated documents.

Based on a determination that the identified category does not include the specified number of annotated documents, the processor 1102 may fetch, decode, and execute the instructions 1118 to generate (e.g., by the corpus generator and enricher 112 that is executed by the at least one hardware processor), for the identified category, additional annotated documents. The annotated documents and the additional annotated documents of the identified category together may represent a corpus.

The processor 1102 may fetch, decode, and execute the instructions 1120 to train (e.g., by an artificial intelligence model generator 114 that is executed by the at least one hardware processor), using the corpus, an artificial intelligence based decision support model 116.

The processor 1102 may fetch, decode, and execute the instructions 1122 to ascertain (e.g., by an inquiry response generator 18 that is executed by the at least one hardware processor), an inquiry related to an entity of the corpus.

The processor 1102 may fetch, decode, and execute the instructions 1124 to generate (e.g., by the inquiry response generator 18 that is executed by the at least one hardware processor), by invoking the artificial intelligence based decision support model 116, a response to the inquiry.

Referring to FIGS. 1-10 and 12, and particularly FIG. 12, for the method 1200, at block 1202, the method may include generating, based on annotated training documents 104, an entity and relation annotation model 106.

At block 1204, the method may include ascertaining a document set 108 that is to be annotated.

At block 1206, the method may include identifying, based on application of the entity and relation annotation model 106 to the document set 108, entities and relations between the entities for each document of the document set 108 to generate an annotated document set.

At block 1208, the method may include categorizing each annotated document of the annotated document set into a respective category of a plurality of categories.

At block 1210, the method may include identifying a category of the plurality of categories.

At block 1212, the method may include determining whether the identified category includes a specified number of annotated documents.

Based on a determination that the identified category does not include the specified number of annotated documents, at block 1214, the method may include generating, for the identified category, additional annotated documents. The annotated documents and the additional annotated documents of the identified category together may represent a corpus.

At block 1216, the method may include training, using the corpus, an artificial intelligence based decision support model 116.

At block 1218, the method may include ascertaining an inquiry related to an entity of the corpus.

At block 1220, the method may include invoking the artificial intelligence based decision support model 116 to generate a response to the inquiry.

Referring to FIGS. 1-10 and 13, and particularly FIG. 13, for the block diagram 1300, the non-transitory computer readable medium 1302 may include instructions 1306 to generate, based on annotated training documents 104, an entity and relation annotation model 106.

The processor 1304 may fetch, decode, and execute the instructions 1308 to ascertain a document set 108 that is to be annotated.

The processor 1304 may fetch, decode, and execute the instructions 1310 to identify, based on application of the entity and relation annotation model 106 to the document set 108, entities and relations between the entities for each document of the document set 108 to generate an annotated document set.

The processor 1304 may fetch, decode, and execute the instructions 1312 to categorize each annotated document of the annotated document set into a respective category of a plurality of categories.

The processor 1304 may fetch, decode, and execute the instructions 1314 to identify a category of the plurality of categories.

The processor 1304 may fetch, decode, and execute the instructions 1316 to determine whether the identified category includes a specified number of annotated documents.

Based on a determination that the identified category does not include the specified number of annotated documents, the processor 1304 may fetch, decode, and execute the instructions 1318 to generate, for the identified category, additional annotated documents. The annotated documents and the additional annotated documents of the identified category together may represent a corpus.

The processor 1304 may fetch, decode, and execute the instructions 1320 to train, using the corpus, an artificial intelligence based decision support model 116.

The processor 1304 may fetch, decode, and execute the instructions 1322 to ascertain an inquiry related to an entity of the corpus.

The processor 1304 may fetch, decode, and execute the instructions 1324 to generate, by invoking the artificial intelligence based decision support model 116, a response to the inquiry.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An artificial intelligence based corpus enrichment for knowledge population and query response apparatus comprising:
   an entity and relation annotator, executed by at least one hardware processor, to
      generate, based on annotated training documents, an entity and relation annotation model,
      ascertain, a document set that is to be annotated, wherein documents of the document set include unstructured documents and semi-structured documents,
      identify, based on application of the entity and relation annotation model to the document set, entities and relations between the entities for each document of the document set to generate an annotated document set,
      determine, for each identified entity of the identified entities, an entity confidence score,
      determine, for each identified relation of the identified relations between the entities, a relation confidence score,
      identify, based on the entity confidence score, an entity that includes an entity confidence score that is less than an entity confidence score threshold,
      identify, based on the relation confidence score, a relation that includes a relation confidence score that is less than a relation confidence score threshold,
      generate another inquiry for verification of the entity and the relation that respectively include the entity confidence score and the relation confidence score that are respectively less than the entity confidence score threshold and the relation confidence score threshold, and
      train, based on a response to the other inquiry for verification of the entity and the relation that respectively include the entity confidence score and the relation confidence score that are respectively less than the entity confidence score threshold and the relation confidence score threshold, the entity and relation annotation model;
   a document categorizer, executed by the at least one hardware processor, to
      categorize each annotated document of the annotated document set into a respective category of a plurality of categories;
   a corpus generator and enricher, executed by the at least one hardware processor, to
      identify a category of the plurality of categories,
      determine whether the identified category includes a specified number of annotated documents, and
      based on a determination that the identified category does not include the specified number of annotated documents, generate, for the identified category, additional annotated documents, wherein the annotated documents and the additional annotated documents of the identified category together represent a corpus;
   an artificial intelligence model generator, executed by the at least one hardware processor, to
      train, using the corpus, an artificial intelligence based decision support model; and
   an inquiry response generator, executed by the at least one hardware processor, to
      ascertain an inquiry related to an entity of the corpus, and
      generate, by invoking the artificial intelligence based decision support model, a response to the inquiry.

2. The artificial intelligence based corpus enrichment for knowledge population and query response apparatus according to claim 1, wherein the entity and relation annotator is further executed by the at least one hardware processor to generate, based on the annotated training documents, the entity and relation annotation model by:
   transforming each annotated training document of the annotated training documents into a vector representation; and
   generating, based on vector representations of the annotated training documents, the entity and relation annotation model.

3. The artificial intelligence based corpus enrichment for knowledge population and query response apparatus according to claim 1, wherein the entity and relation annotator is further executed by the at least one hardware processor to:
   identify entities for which a difference between entity confidence scores is less than a specified numerical value;
   identify relations for which a difference between relation confidence scores is less than the specified numerical value;
   generate another inquiry for verification of the entities for which the difference between the entity confidence scores is less than the specified numerical value, and the relations for which the difference between the relation confidence scores is less than the specified numerical value; and
   train, based on a response to the other inquiry for verification of the entities for which the difference between the entity confidence scores is less than the specified numerical value, and the relations for which the difference between the relation confidence scores is less than the specified numerical value, the entity and relation annotation model.

4. The artificial intelligence based corpus enrichment for knowledge population and query response apparatus according to claim 1, wherein the document categorizer is further executed by the at least one hardware processor to:
   categorize each document of the document set that is to be annotated into the respective category of the plurality of categories,
   wherein the entity and relation annotator is further executed by the at least one hardware processor to identify, based on application of the entity and relation annotation model to the document set, entities and relations between the entities for each document of the document set to generate the annotated document set by:
      identifying, based on application of the entity and relation annotation model to documents of the identified category, entities and relations between the entities for each document of the identified category to generate annotated documents for the identified category.

5. The artificial intelligence based corpus enrichment for knowledge population and query response apparatus according to claim 1, wherein the document categorizer is further executed by the at least one hardware processor to categorize each annotated document of the annotated document set into the respective category of the plurality of categories by:
   transforming each annotated document of the annotated document set into an entity vector;
   grouping, based on the entity vector for each annotated document, semantically similar entities; and categorizing, based on the grouping, each annotated document of the annotated document set into the respective category of the plurality of categories.

6. The artificial intelligence based corpus enrichment for knowledge population and query response apparatus according to claim 1, wherein the corpus generator and enricher is further executed by the at least one hardware processor to generate, for the identified category, additional annotated documents by:
segmenting the corpus into a plurality of sections to generate a preprocessed and segmented entity-annotated textual corpus.

7. The artificial intelligence based corpus enrichment for knowledge population and query response apparatus according to claim 6, wherein for an invoice document, the plurality of sections include header, body, payment, and reference.

8. The artificial intelligence based corpus enrichment for knowledge population and query response apparatus according to claim 6, wherein the corpus generator and enricher is further executed by the at least one hardware processor to generate, for the identified category, additional annotated documents by:
transforming each segment of the preprocessed and segmented entity-annotated textual corpus into a character representation to generate a plurality of character representations;
consolidating, based on the character representations, segments of the preprocessed and segmented entity-annotated textual corpus; and
learning, from each segment of the segments, character embeddings.

9. The artificial intelligence based corpus enrichment for knowledge population and query response apparatus according to claim 8, wherein the corpus generator and enricher is further executed by the at least one hardware processor to generate, for the identified category, additional annotated documents by:
ascertaining a seed document;
segmenting the seed document into another plurality of sections;
transforming each segment of the segmented seed document into character represented vector embeddings;
generating a plurality of corresponding segments specific to each transformed segment of the segmented seed document; and
generating, based on the plurality of corresponding segments and the learned character embeddings, the additional annotated documents.

10. A computer implemented method for artificial intelligence based corpus enrichment for knowledge population and query response comprising:
generating, by an entity and relation annotator that is executed by at least one hardware processor, based on annotated training documents, an entity and relation annotation model;
ascertaining, by the entity and relation annotator that is executed by the at least one hardware processor, a document set that is to be annotated;
identifying, by the entity and relation annotator that is executed by the at least one hardware processor, based on application of the entity and relation annotation model to the document set, entities and relations between the entities for each document of the document set to generate an annotated document set;
determining, by the entity and relation annotator that is executed by the at least one hardware processor, for each identified entity of the identified entities, an entity confidence score;
determining, by the entity and relation annotator that is executed by the at least one hardware processor, for each identified relation of the identified relations between the entities, a relation confidence score;
identifying, by the entity and relation annotator that is executed by the at least one hardware processor, based on the entity confidence score, an entity that includes an entity confidence score that is less than an entity confidence score threshold;
identifying, by the entity and relation annotator that is executed by the at least one hardware processor, based on the relation confidence score, a relation that includes a relation confidence score that is less than a relation confidence score threshold;
generating, by the entity and relation annotator that is executed by the at least one hardware processor, another inquiry for verification of the entity and the relation that respectively include the entity confidence score and the relation confidence score that are respectively less than the entity confidence score threshold and the relation confidence score threshold;
training, by the entity and relation annotator that is executed by the at least one hardware processor, based on a response to the other inquiry for verification of the entity and the relation that respectively include the entity confidence score and the relation confidence score that are respectively less than the entity confidence score threshold and the relation confidence score threshold, the entity and relation annotation model;
categorizing, by a document categorizer that is executed by the at least one hardware processor, each annotated document of the annotated document set into a respective category of a plurality of categories;
identifying, by a corpus generator and enricher that is executed by the at least one hardware processor, a category of the plurality of categories;
determining, by the corpus generator and enricher that is executed by the at least one hardware processor, whether the identified category includes a specified number of annotated documents;
based on a determination that the identified category does not include the specified number of annotated documents, generating, by the corpus generator and enricher that is executed by the at least one hardware processor, for the identified category, additional annotated documents, wherein the annotated documents and the additional annotated documents of the identified category together represent a corpus;
training, by an artificial intelligence model generator that is executed by the at least one hardware processor, using the corpus, an artificial intelligence based decision support model;
ascertaining, by an inquiry response generator that is executed by the at least one hardware processor, an inquiry related to an entity of the corpus; and
invoking, by the inquiry response generator that is executed by the at least one hardware processor, the artificial intelligence based decision support model to generate a response to the inquiry.

11. The method according to claim 10, wherein generating, by the entity and relation annotator that is executed by the at least one hardware processor, based on the annotated training documents, the entity and relation annotation model further comprises:

transforming, by the entity and relation annotator that is executed by the at least one hardware processor, each annotated training document of the annotated training documents into a vector representation; and generating, by the entity and relation annotator that is executed by the at least one hardware processor, based on vector representations of the annotated training documents, the entity and relation annotation model.

12. The method according to claim 10, further comprising:

identifying, by the entity and relation annotator that is executed by the at least one hardware processor, entities for which a difference between entity confidence scores is less than a specified numerical value;

identifying, by the entity and relation annotator that is executed by the at least one hardware processor, relations for which a difference between relation confidence scores is less than the specified numerical value;

generating, by the entity and relation annotator that is executed by the at least one hardware processor, another inquiry for verification of the entities for which the difference between the entity confidence scores is less than the specified numerical value, and the relations for which the difference between the relation confidence scores is less than the specified numerical value; and training, by the entity and relation annotator that is executed by the at least one hardware processor, based on a response to the other inquiry for verification of the entities for which the difference between the entity confidence scores is less than the specified numerical value, and the relations for which the difference between the relation confidence scores is less than the specified numerical value, the entity and relation annotation model.

13. The method according to claim 10, further comprising:

categorizing, by the document categorizer that is executed by the at least one hardware processor, each document of the document set that is to be annotated into the respective category of the plurality of categories; and identifying, by the entity and relation annotator that is executed by the at least one hardware processor, based on application of the entity and relation annotation model to documents of the identified category, entities and relations between the entities for each document of the identified category to generate annotated documents for the identified category.

14. The method according to claim 10, wherein categorizing each annotated document of the annotated document set into the respective category of the plurality of categories further comprises:

transforming, by the document categorizer that is executed by the at least one hardware processor, each annotated document of the annotated document set into an entity vector;

grouping, by the document categorizer that is executed by the at least one hardware processor, based on the entity vector for each annotated document, semantically similar entities; and categorizing, by the document categorizer that is executed by the at least one hardware processor, based on the grouping, each annotated document of the annotated document set into the respective category of the plurality of categories.

15. A non-transitory computer readable medium having stored thereon machine readable instructions, the machine readable instructions, when executed by at least one hardware processor, cause the at least one hardware processor to:

generate, based on annotated training documents, an entity and relation annotation model;

ascertain a document set that is to be annotated;

identify, based on application of the entity and relation annotation model to the document set, entities and relations between the entities for each document of the document set to generate an annotated document set;

determine, for each identified entity of the identified entities, an entity confidence score;

determine, for each identified relation of the identified relations between the entities, a relation confidence score;

identify, based on the entity confidence score, an entity that includes an entity confidence score that is less than an entity confidence score threshold;

identify, based on the relation confidence score, a relation that includes a relation confidence score that is less than a relation confidence score threshold;

generate another inquiry for verification of the entity and the relation that respectively include the entity confidence score and the relation confidence score that are respectively less than the entity confidence score threshold and the relation confidence score threshold;

train, based on a response to the other inquiry for verification of the entity and the relation that respectively include the entity confidence score and the relation confidence score that are respectively less than the entity confidence score threshold and the relation confidence score threshold, the entity and relation annotation model;

categorize each annotated document of the annotated document set into a respective category of a plurality of categories;

identify a category of the plurality of categories;

determine whether the identified category includes a specified number of annotated documents;

based on a determination that the identified category does not include the specified number of annotated documents, generate, for the identified category, additional annotated documents, wherein the annotated documents and the additional annotated documents of the identified category together represent a corpus;

train, using the corpus, an artificial intelligence based decision support model;

ascertain an inquiry related to an entity of the corpus; and generate, by invoking the artificial intelligence based decision support model, a response to the inquiry.

16. The non-transitory computer readable medium according to claim 15, wherein the machine readable instructions to generate, for the identified category, additional annotated documents, when executed by the at least one hardware processor, further cause the at least one hardware processor to:

segment the corpus into a plurality of sections to generate a preprocessed and segmented entity-annotated textual corpus.

17. The non-transitory computer readable medium according to claim 16, wherein the machine readable instructions to generate, for the identified category, additional annotated documents, when executed by the at least one hardware processor, further cause the at least one hardware processor to:

transform each segment of the preprocessed and segmented entity-annotated textual corpus into a character representation to generate a plurality of character representations;

consolidate, based on the character representations, segments of the preprocessed and segmented entity-annotated textual corpus; and learn, from each segment of the segments, character embeddings.

18. The non-transitory computer readable medium according to claim 17, wherein the machine readable instructions to generate, for the identified category, additional annotated documents, when executed by the at least one hardware processor, further cause the at least one hardware processor to:

ascertain a seed document;

segment the seed document into another plurality of sections;

transform each segment of the segmented seed document into character represented vector embeddings;

generate a plurality of corresponding segments specific to each transformed segment of the segmented seed document; and generate, based on the plurality of corresponding segments and the learned character embeddings, the additional annotated documents.

\* \* \* \* \*